(12) United States Patent
Hasegawa

(10) Patent No.: US 10,299,136 B2
(45) Date of Patent: May 21, 2019

(54) TRANSMISSION APPARATUS, RECEPTION APPARATUS, AND COMMUNICATION SYSTEM

(71) Applicant: Mitsubishi Electric Corporation, Chiyoda-ku (JP)

(72) Inventor: Fumihiro Hasegawa, Tokyo (JP)

(73) Assignee: Mitsubishi Electric Corporation, Chiyoda-ku (JP)

(*) Notice: Subject to any disclaimer, the term of this patent is extended or adjusted under 35 U.S.C. 154(b) by 190 days.

(21) Appl. No.: 15/029,513

(22) PCT Filed: Apr. 30, 2014

(86) PCT No.: PCT/JP2014/062019
§ 371 (c)(1),
(2) Date: Apr. 14, 2016

(87) PCT Pub. No.: WO2015/064127
PCT Pub. Date: May 7, 2015

(65) Prior Publication Data
US 2016/0277936 A1    Sep. 22, 2016

(30) Foreign Application Priority Data
Oct. 30, 2013    (JP) .................................. 2013-225564

(51) Int. Cl.
*H04L 12/24* (2006.01)
*H04W 16/14* (2009.01)
(Continued)

(52) U.S. Cl.
CPC ............. *H04W 16/14* (2013.01); *H04J 11/00* (2013.01); *H04L 27/2636* (2013.01); *H04L 27/2644* (2013.01); *H04W 72/082* (2013.01)

(58) Field of Classification Search
CPC ........... H04W 72/0453; H04W 76/046; H04W 72/042; H04W 72/0413; H04W 28/14;
(Continued)

(56) References Cited

U.S. PATENT DOCUMENTS 8,201,063 B2   6/2012   Ban
2008/0222482 A1*   9/2008   Ban ..................... H04L 27/2607
714/752
(Continued)

FOREIGN PATENT DOCUMENTS

CN   101262465 A   9/2008
CN   101662447 A   3/2010
(Continued)

OTHER PUBLICATIONS

Extended European Search Report dated Feb. 24, 2017 in Patent Application No. 14857632.5.
(Continued)

*Primary Examiner* — Lan-Huong Truong
(74) *Attorney, Agent, or Firm* — Oblon, McClelland, Maier & Neustadt, L.L.P.

(57) ABSTRACT

A transmission apparatus includes: a data-symbol generation unit that generates data symbols for one block in each block; a storage and processing unit that stores therein a data symbol at a first position, among the data symbols for one block, as a copied symbol; a symbol insertion unit that generates a block symbol by putting the data symbols and the copied symbol such that the copied symbol stored in the storage and processing unit are inserted at a second position of the data symbols for one block; a time/frequency conversion unit that converts the block signal into a frequency domain signal; an interpolation unit that performs interpolation processing on the frequency domain symbol; and a CP insertion unit that generates the block signal by inserting a
(Continued)

Cyclic Prefix into a signal on which the interpolation processing has been performed.

13 Claims, 34 Drawing Sheets

(51) Int. Cl.
*H04J 11/00* (2006.01)
*H04L 27/26* (2006.01)
*H04W 72/08* (2009.01)

(58) Field of Classification Search
CPC ... H04L 1/1812; H04L 1/1819; H04L 1/1896; H04L 1/1822
See application file for complete search history.

(56) References Cited

U.S. PATENT DOCUMENTS

| | | | |
|---|---|---|---|
| 2009/0103645 A1 | 4/2009 | Jitsukawa et al. | |
| 2009/0239551 A1* | 9/2009 | Woodsum | H04B 7/086 455/456.1 |
| 2010/0061224 A1* | 3/2010 | Noh | H04L 27/2607 370/210 |
| 2011/0051747 A1* | 3/2011 | Schmidl | H04L 27/2613 370/474 |
| 2011/0150128 A1* | 6/2011 | Yamazaki | H04L 25/03828 375/295 |
| 2012/0099681 A1 | 4/2012 | Yoshimochi et al. | |
| 2012/0166119 A1* | 6/2012 | Nentwig | H04L 25/0384 702/66 |
| 2012/0230449 A1 | 9/2012 | Futatsugi et al. | |

FOREIGN PATENT DOCUMENTS

| | | |
|---|---|---|
| JP | 2009-10662 A | 1/2009 |
| JP | 2010/055639 A1 | 5/2010 |
| JP | 2012-90080 A | 5/2012 |
| WO | 2008/001457 A1 | 1/2008 |
| WO | 2011/055833 A1 | 5/2011 |

OTHER PUBLICATIONS

Combined Chinese Office Action and Search Report dated Sep. 21, 2017 in Chinese Patent Application No. 201480059082.5 (with partial unedited computer generated English translation and English translation of Category of Cited Documents).

Fumihiro Hasegawa, et al., "A Novel Out-Of-Band Power Suppression Method for SC-OFDM", Proceedings of the 2013 IEICE General Conference, Tsushin 1, B-5-127, Total 2 Pages, (Mar. 5, 2013) (with Partial English Translation).

Nevio Benvenuto, et al., "Single Carrier Modulation With Nonlinear Frequency Domain Equalization: An Idea Whose Time Has Come—Again", Proceedings of the IEEE, vol. 98, No. 1, pp. 69-96, (Jan. 2010).

John A.C. Bingham, "Multicarrier Modulation for Data Transmission: An Idea Whose Time Has Come", IEEE Communications Magazine, vol. 28, No. 5, pp. 5-14, (May 1990).

Ivan Cosovic, et al., "Subcarrier Weighting: A Method for Sidelobe Suppression in OFDM Systems", IEEE Communications Letters, vol. 10, No. 6, pp. 444-446, (Jun. 2006).

Jaap van de Beek, et al., "Out-of-Bond Power Suppression in OFDM", IEEE Communications Letters, vol. 12, No. 9, pp. 609-611, (Sep. 2008).

Jun Tan, et al., "Frequency-Domain Equalization for Continuous Phase Modulation", IEEE Transactions on Wireless Communications, vol. 4, No. 5, pp. 2479-2490, (Sep. 2005).

Char-Dir Chung, "Spectrally Precoded OFDM", IEEE Transactions on Communications, vol. 54, No. 12, pp. 2173-2185, (Dec. 2006).

Jaap van de Beek, et al., "N-continuous OFDM", IEEE Communications Letters, vol. 13, No. 1, pp. 1-3, (Jan. 2009).

International Search Report dated Jul. 29, 2014 in PCT/JP14/062019 Filed Apr. 30, 2014.

* cited by examiner

FIG.24

| | | kTH BLOCK | k+1TH BLOCK | k+2TH BLOCK | |
|---|---|---|---|---|---|
| → | 0 | 000100 | 100111 | 110011 | |
| → | 1 | 101110 | 000000 | 000101 | |
| → | 2 | 011100 | 111111 | 011100 | |
| | 3 | 000000 | 001100 | 100000 | |
| | 4 | 101010 | 011011 | 101010 | |
| | 5 | 011001 | 011000 | 011111 | |
| | ⋮ | ⋮ | ⋮ | ⋮ | |
| | Y-2 | 010110 | 101110 | 100000 | |
| → | Y-1 | 111100 | 100000 | 000000 | |
| → | Y | 000001 | 001100 | 101100 | |
| → | Y+1 | 110011 | 100111 | 000001 | |
| → | Y+2 | 011011 | 011110 | 110000 | |
| | ⋮ | ⋮ | ⋮ | ⋮ | |
| | $N_D$-2 | 000010 | 110100 | 110001 | |
| → | $N_D$-1 | 101110 | 001100 | 100111 | |

↑
SYMBOL NUMBER

TRANSMISSION APPARATUS, RECEPTION APPARATUS, AND COMMUNICATION SYSTEM

FIELD

The present invention relates to a transmission apparatus, a reception apparatus, and a communication system.

BACKGROUND

In a digital communication system, frequency selectivity and time variability in a channel arise because of multipath phasing caused by a transmission signal being reflected by buildings or the like or Doppler variation caused by the terminal moving. In such a multipath environment, a received signal becomes a signal in which a transmission symbol and a symbol arriving after a delay time interfere with each other.

Using a single carrier block transmission method with this kind of frequency selective channel in order to obtain the best receiving characteristics has recently attracted attention (see, for example, Non Patent Literature 1 listed below). The single carrier (SC) block transmission system can reduce the peak power compared with an OFDM (Orthogonal Frequency Division Multiplexing) transmission method, which is multi-carrier (Multiple Carrier: MC) block transmission (see, for example, Non Patent Literature 2 listed below).

With a transmitter that performs SC block transmission, measures against multipath phasing are taken by performing, for example, the following kinds of transmission. First, after generating a PSK (Phase Shift Keying) signal or a QAM (Quadrature Amplitude Modulation) signal, which are digital modulation signals, in a "Modulator", the digital modulation signal is converted to a time domain signal by a precoder and an IDFT (Inverse Discrete Fourier Transform) processing unit. Thereafter, as a measure against multipath phasing, a CP (Cyclic Prefix) is inserted by a CP insertion unit. The CP insertion unit copies a predetermined number of samples next to the time domain signal and adds the samples to the head of a transmission signal. In addition to this method, as a measure against multipath phasing, ZP (Zero Padding: zero insertion) is performed by inserting zero into a start portion and an end portion of data.

Furthermore, in order to reduce transmission peak power, in a transmitter that performs SC transmission, a precoder normally performs DFT (Discrete Fourier Transform) processing.

CITATION LIST

Non Patent Literatures

Non Patent Literature 1: N Benvenuto, R. Dinis, D. Falconer and S. Tomasin, "Single Carrier Modulation With Non-linear Frequency Domain Equalization: An Idea Whose Time Has Come-Again", Proceedings of the IEEE, vol. 98, No. 1, January 2010, pp. 69-96.
Non Patent Literature 2: J. A. C. Bingham, "Multicarrier Modulation For Data Transmission: An Idea Whose Time Has Come", IEEE Commun. Mag., vol. 28, No. 5, May 1990, pp. 5-14.

SUMMARY

Technical Problem

According to the conventional SC block transmission technique described above, transmission peak power is reduced while the effect of multipath phasing is reduced. However, with the SC block transmission, the phase and the amplitude become discontinuous between the SC blocks, and thus out-of-band spectrum or out-of-band leakage occurs. Because the out-of-band spectrum interferes with an adjacent channel, the out-of-band spectrum needs to be reduced. Further, in a general communication system, a spectral mask is defined, and the out-of-band spectrum needs to be reduced so as to satisfy the mask.

The present invention has been achieved in view of the above problems, and an object of the present invention is to provide a transmission apparatus, a reception apparatus, and a communication system that can reduce an out-of-band spectrum.

Solution to Problem

In order to solve the problem and achieve the objective mentioned above, the present invention relates to a transmission apparatus that transmits a block signal including a plurality of data symbols. The transmission apparatus includes: a data-symbol generation unit that, in each block, generates data symbols for one block; a storage unit that stores therein a data symbol at a first position, among the data symbols for one block generated by the data-symbol generation unit, as a copied symbol; a symbol insertion unit that generates a block symbol with an arrangement of the data symbol and the copied symbol such that the copied symbol in a block one before, stored in the storage unit, is inserted at a second position of the data symbols for one block generated by the data-symbol generation unit; a time/frequency conversion unit that converts the block symbol into a frequency domain signal; an interpolation unit that performs interpolation processing on the frequency domain symbol; and a CP insertion unit that inserts a Cyclic Prefix into a signal on which the interpolation processing has been performed so as to generate the block signal.

Advantageous Effects of Invention

According to the present invention, an out-of-band spectrum can be reduced.

BRIEF DESCRIPTION OF DRAWINGS

FIG. 24 is a diagram illustrating an example of the arrangement of symbols when the 64QAM constellation is used and $N_L=1$ and $N_R=2$.

DESCRIPTION OF EMBODIMENTS

Exemplary embodiments of a transmission apparatus, a reception apparatus, and a communication system according to the present invention will be explained below in detail with reference to the accompanying drawings. The present invention is not limited to the embodiments.

First Embodiment

Figure 1:
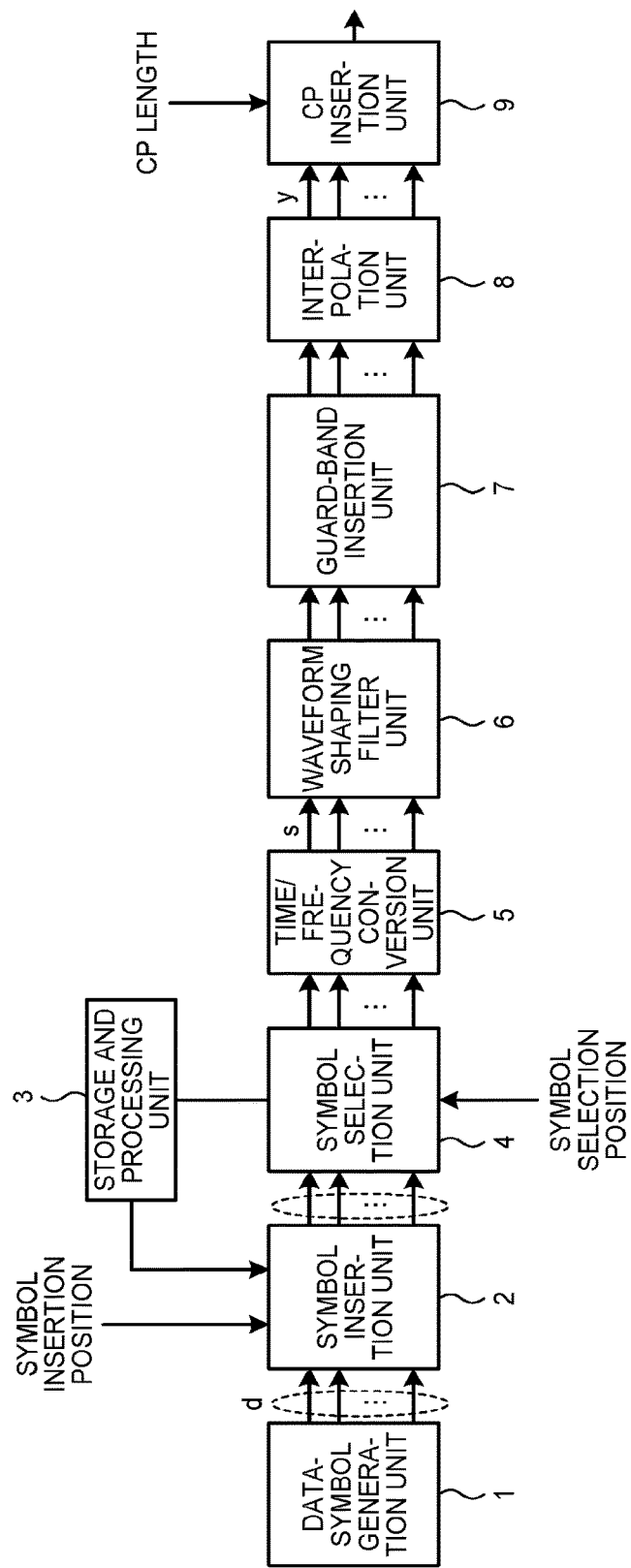
FIG. 1 is a diagram illustrating an example of functional configuration of a transmission apparatus according to a first embodiment.

FIG. 1 is a diagram illustrating an example of functional configuration by a transmission apparatus according to a first embodiment of the present invention. As illustrated in FIG. 1, the transmission apparatus according to the present embodiment includes a symbol generation unit 1 (data-symbol generation unit), a symbol insertion unit 2, a storage and processing unit 3 (storage unit), a symbol selection unit 4, a time/frequency conversion unit 5, a waveform shaping filter unit (waveform shaping unit) 6, a guard-band insertion unit 7, an interpolation unit 8, and a CP insertion unit 9. In FIG. 1, the storage and processing unit 3 is referred to as the "storage/processing unit 3".

The symbol generation unit 1 generates a data symbol (e.g., a PSK (Phase Shift Keying) symbol, a QAM (Quadrature Amplitude Modulation) symbol, or the like). The symbol generation unit 1 inputs the generated data symbol to the symbol insertion unit 2.

The symbol insertion unit 2 inserts, with respect to the input data symbol, one or more symbols stored in the storage and processing unit 3 at a position designated by symbol insertion position information indicating the insertion position of the symbol (a second position). An input into the symbol insertion unit 2 is the symbol insertion position information and an output from the storage and processing unit 3. The symbol selection unit 4 inputs a symbol group, into which the symbols are inserted by the symbol insertion unit 2, to the time/frequency conversion unit 5; selects one or more symbols (copied symbols) from the symbol group; and copies and transmits the selected symbols to the storage and processing unit 3. The position of the symbol selected by the symbol selection unit 4 (a first position) is designated by symbol selection position information. The storage and processing unit 3 stores therein the symbols input from the symbol selection unit 4. When performing processing of the next block, the storage and processing unit 3 outputs the symbols (copied symbols) stored therein to the symbol insertion unit 2. Alternatively, when processing the next block, the symbol insertion unit 2 can read the symbols stored in the storage and processing unit 3.

Figure 2:
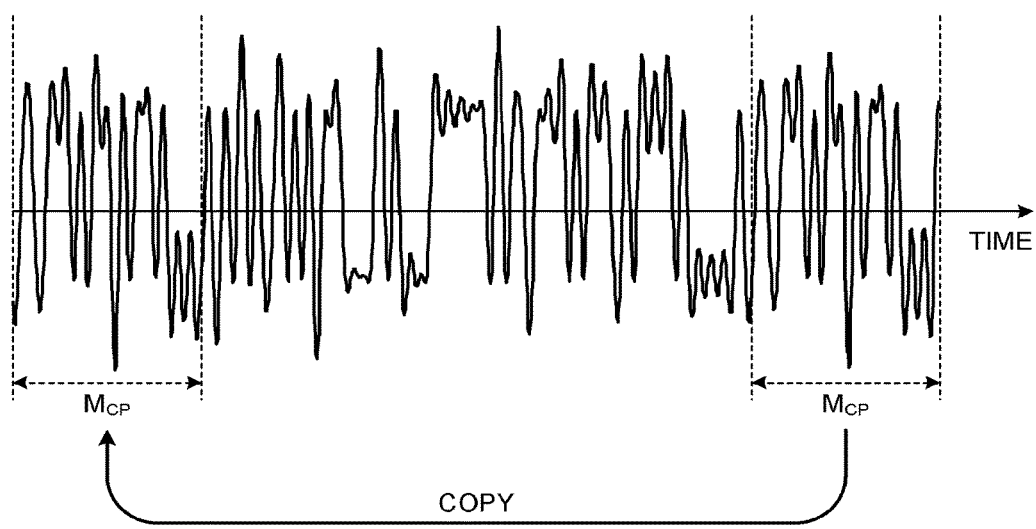
FIG. 2 is a diagram illustrating an example of CP insertion.

The time/frequency conversion unit 5 converts a time domain signal (a symbol group) output from the symbol selection unit 4 into a frequency domain signal. The waveform shaping filter unit 6 performs the desired filtering processing on the frequency domain signal. The guard-band insertion unit 7 performs guard-band insertion processing on the frequency domain signal on which the filtering processing has been performed. Generally, the guard-band is inserted into the frequency domain signal to prevent signal quality deterioration due to interference from an adjacent signal in the frequency domain. The interpolation unit 8 performs interpolation processing on the frequency domain signal on which the guard-band insertion processing has been performed, and it converts the frequency domain signal on which the interpolation processing has been performed into the time domain signal. The CP insertion unit 9 inserts a CP into the time domain signal output from the interpolation unit 8. FIG. 2 is a diagram illustrating an example of CP insertion. The CP insertion unit 9 copies the last $M_{CP}$ sample of the block and puts the sample at the head of the block. The CP inserted signal is transmitted as an SC block signal (block signal). The interpolation unit 8 can use any interpolation processing method so long as a point interpolated so as to perform interpolation between the last symbol in the block and the first symbol in the block is set in the last sample of the block in the time domain signal after performing the interpolation processing. That is, it is acceptable if the interpolation processing is performed such that the last sample after the interpolation processing (a point added by interpolation) becomes a point smoothly connected to a value of the first sample of the block in the time domain signal after performing the interpolation processing.

Figure 3:
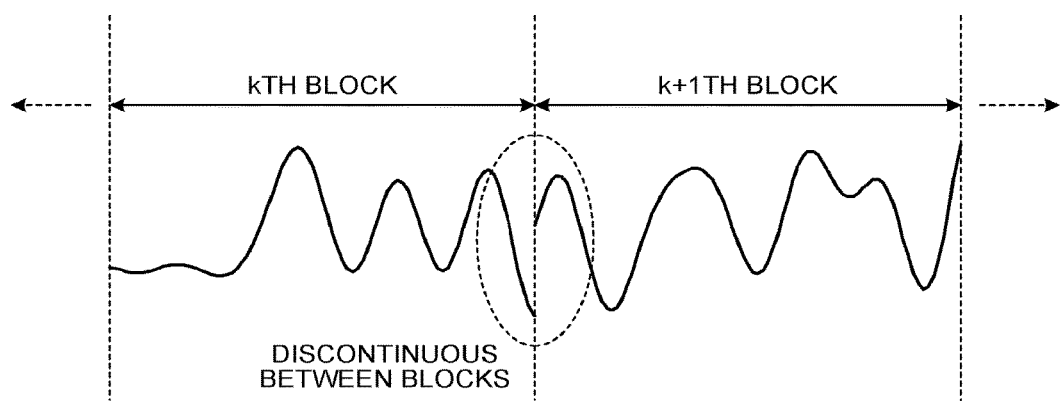
FIG. 3 is a diagram illustrating an example in which the phase and amplitude become discontinuous between SC blocks during conventional SC block transmission.

Conventional SC block transmission is described here. With SC block transmission, the phase and the amplitude become discontinuous between SC blocks. FIG. 3 is a diagram illustrating an example in which the phase and the amplitude become discontinuous between SC blocks in the conventional SC block transmission. In the example in FIG. 3, an out-of-band spectrum or out-of-band leakage occurs due to phase discontinuity between the $k^{th}$ (k is an integer) block and the $k+1^{th}$ block. Such an out-of-band spectrum interferes with an adjacent channel. In the present embodiment, the out-of-band spectrum is reduced by inserting a symbol at a predetermined position in a previous block into between data symbols.

Figure 4:
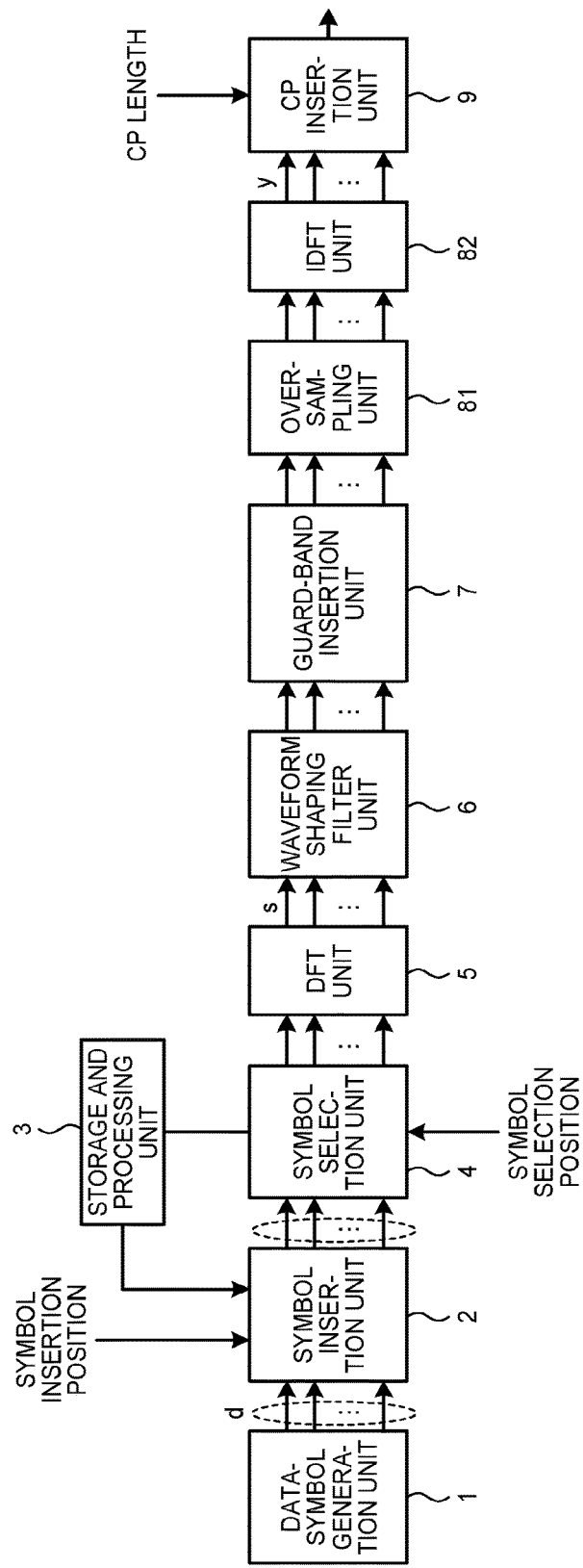
FIG. 4 is a diagram illustrating an example configuration of a time/frequency conversion unit and an interpolation unit according to the first embodiment.

FIG. 4 is a diagram illustrating an example configuration of the time/frequency conversion unit 5 and of the interpolation unit 8 according to the present embodiment. FIG. 4 illustrates an example in which the configuration of the interpolation unit 8 includes an oversampling unit 81 and an IDFT processing unit 82. The time/frequency conversion unit 5 is set as a DFT processing unit 5. The symbol generation unit 1, the symbol insertion unit 2, the storage and processing unit 3, the symbol selection unit 4, the guard-band insertion unit 7, and the CP insertion unit 9 are the same as those of the example configuration in FIG. 1. An operation of the present embodiment is described in accordance with the example configuration in FIG. 4.

For example, it is assumed that the number of symbols selected by the symbol selection unit 4 is 1, and the number of symbols inserted by the symbol insertion unit 2 is 1. In this case, it is assumed that the number of symbols after the symbols are inserted by the symbol insertion unit 2 is N; and it is assumed that a symbol selection position of the symbol selection unit 4 is n (0≤n≤N−1) (i.e., the symbol selection unit 4 selects the $n^{th}$ symbol in the symbol group to be input). In the processing to generate a $k^{th}$ SC block signal, the generated $i^{th}$ symbol is designated as $d_i^{(k)}$. The position into which the symbol insertion unit 2 inserts the symbol is designated as m (0≤m≤N−1) (i.e., it is assumed that the symbol is inserted between the $(m-1)^{th}$ data symbol and the $m^{th}$ data symbol). It is also assumed that $d_m^{(k-1)}$ is copied by the symbol selection unit 4 and stored in the storage and processing unit 3 during the processing of the previous block (a $(k-1)^{th}$ SC block signal) before generating the $k^{th}$ SC block signal. At this time, the output of the symbol insertion unit 2 is as given by the following expression (1).

[Expression 1]

$$d^{(k)} = [d_0^{(k)}, d_1^{(k)}, \ldots, d_{m-1}^{(k)}, d_n^{(k-1)}, d_{m+1}^{(k)}, \ldots d_{N-1}^{(k)}]_T \quad (1)$$

As illustrated in the following expression (2), the storage and processing unit 3 can apply phase rotation to the stored symbol so as to output the phase-rotated symbol into the symbol insertion unit 2.

[Expression 2]

$$d^{(k)} = [d_0^{(k)}, d_1^{(k)}, \ldots, d_{m-1}^{(k)}, \beta \cdot d_n^{(k-1)}, d_{m+1}^{(k)}, \ldots d_{N-1}^{(k)}]_T \quad (2)$$

β is a complex number, and it is a value such as $\beta = \alpha e^{jf}$, where j is the imaginary unit ($j=\sqrt{(-1)}$), α is the amplitude adjustment value, and f is the phase rotation. The phase rotation varies according to the zero padding method.

The DFT unit 5 performs DFT processing on the time domain signal that is output from the symbol selection unit 4; and the output signal becomes a frequency domain signal as given by the following expression (3). The frequency domain signal is in a vector representation in the expression (3) and is referred to as a "frequency domain signal vector".

[Expression 3]

$$s^{(k)} = [s_0^{(k)}, s_1^{(k)}, \ldots, s_{N-1}^{(k)}]^T \quad (3)$$

Figure 5:
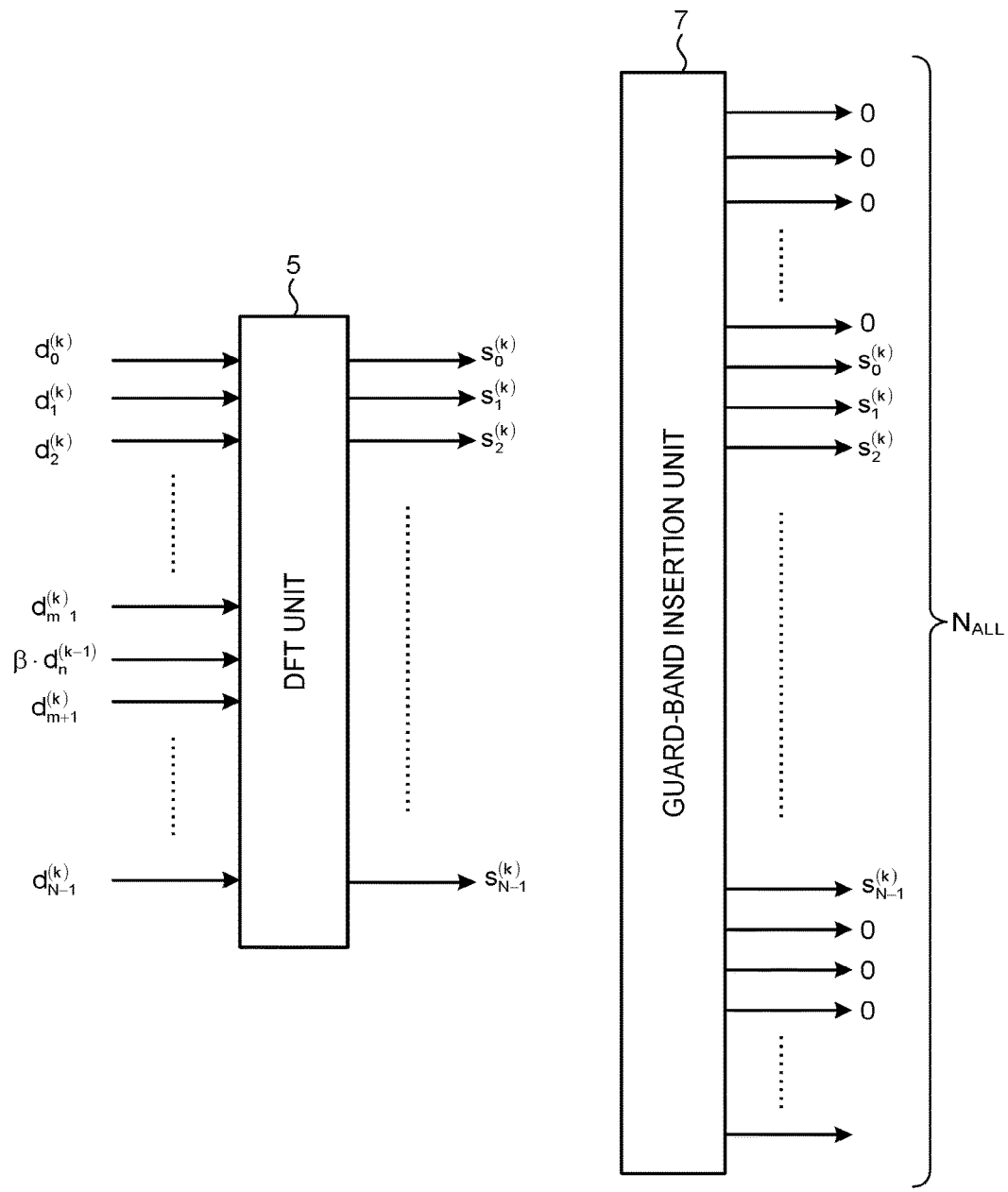
FIG. 5 is a diagram illustrating an example of guard-band insertion processing according to the first embodiment.

The waveform shaping filter unit 6 performs filtering processing on the frequency domain signal vector $s^{(k)}$ in order to remove signals other than the signals in the desired frequency domain. The guard-band insertion unit 7 performs guard-band insertion processing on the frequency domain signal on which the filtering processing has been performed. FIG. 5 is a diagram illustrating an example of guard-band processing according to the present embodiment. The guard-band insertion unit 7 inserts, as the guard-band insertion processing, zero into both sides of the signal in the frequency domain. The total number of samples (points) after zero has been inserted thereto is designated as $N_{ALL}$. In FIG. 5, illustration of the waveform shaping filter unit 6 is omitted in order to simplify the description.

The oversampling unit 81 performs oversampling, for example, by zero padding on the frequency domain signal on which the guard-band insertion processing has been performed. Specifically, the oversampling unit 81 performs oversampling (typically, processing to increase the sampling rate in order to make the sampling interval narrower) by using a signal interpolation formula, described, for example, in "B. Porat, "A Course in Digital Signal Processing", John Wiley and Sons Inc., 1997" (hereinafter, "Porat Literature"), so as to perform oversampling on the input signal such that sampling points per symbol become L. That is, oversampling is performed such that the sampling rate becomes L times with respect to the input. The oversampling rate is a value indicating how many times the sampling rate after oversampling is as large as the input sampling rate.

The IDFT unit 82 converts the frequency domain signal on which oversampling has been performed into the time domain signal by performing IDFT processing. The interpolated sample point is added between symbols by the IDFT processing. Due to the circularity of the IDFT output explained in the Porat Literature described above, an interpolated point added subsequent to the last symbol becomes a point that interpolates between the last symbol and the first symbol.

In order to perform the CP insertion such that the continuity of the phases between the blocks is maintained, the phase of the signal on which the IDFT processing has been performed at a predetermined position may be made approach a desired value. Specifically, the number of samples ($M_{CP}$ in FIG. 2) to be copied when CP is inserted is determined to be such that the phase of the head of a region to be copied when CP is inserted in the respective blocks and the last sample point in the previous block become continuous.

To approximate the phase of the signal on which the IDFT processing has been performed at the predetermined position to the desired value (i.e., to fix the phase at the predetermined position), for example, arrangement positions of the symbols are decided by using positive integers $\mu$ and $\chi$ that satisfy the following expression (4), where it is assumed $0 \leq a \leq N/\chi - 1$.

[Expression 4]

$$a\mu/N_{ALL} = a\chi/N \quad (4)$$

An arbitrary value can be used as 'a' described above; however, 'a' becomes a parameter for deciding a CP length. The CP length is decided according to a delay time due to a multipath present on a channel. That is, when a value of 'a' is to be set, a CP length $M_{CP}$ is set as $(N_{ALL} - a\mu)L$, so that $(N_{ALL} - a\mu)L$ becomes longer than the maximum delay time in the channel.

For example, in a case where N=24 and $N_{ALL}$=32, $\mu$=4 and $\chi$=3 are established. Given that $0 \leq a \leq 24/3 - 1$ is established, in a case where L=1 (without oversampling), the phase of the $a\mu^{th}$ sample of the IDFT unit 82 approaches the phase of the $a\chi(0 \leq a\chi \leq N-1)^{th}$ sample (symbol) in a phase-rotated input of the DFT unit 5 (a sample corresponding to the $a\chi^{th}$ sample). Accordingly, when the symbol insertion unit 2 puts $d_n^{(k-1)}$ at the $a\chi^{th}$ position, the phase of the $a\chi^{th}$ sample in the output of the IDFT unit 82 approaches the phase of the phase-rotated $d_n^{(k-1)}$.

For example, it is assumed that L=1; the processing by the waveform shaping filter unit 6 is omitted; and guard-band insertion is performed according to the following expression (5).

[Expression 5]

$$s_Z = [0_{1,(N_{ALL}-N)/2}, s_0, s_1, \ldots, s_{N-1}, 0_{1,(N_{ALL}-N)/2}]^T \quad (5)$$

In this case, an output of the IDFT unit 82 is represented by the following expression (6).

[Expression 6]

$$r_l = \frac{e^{j\pi\left(1 - \frac{N}{N_{ALL}}\right)l}}{N} \sum_{n=0}^{N-1} d_n \sum_{k=0}^{N-1} e^{j2\pi k \left(\frac{1}{N_{ALL}} - \frac{n}{N}\right)} \quad (6)$$

$$0 \leq l \leq N_{ALL} - 1$$

That is, in the above example, the following expression (7) is established.

[Expression 7]

$$r_{a\mu} = d_{a\chi} e^{j\pi a(\mu - \chi)} \quad (7)$$

In the case where N=24 and $N_{ALL}$=32, the $a\mu^{th}$ output signal of the IDFT unit 82 becomes as follows.
$r_0 = d_0$, $r_4 = -d_3$, $r_8 = d_5$, $r_{12} = -d_9$, $r_{16} = d_{12}$, $r_{20} = -d_{15}$, $r_{24} = d_{18}$, and $r_{28} = -d_{21}$ For example, given that $r_{28}$ is set as $d_0^{(k-1)}$, the following may be set: $\beta = -1$ and $d_{21} = -1 \cdot d_0^{(k-1)}$.

When the oversampling rate is L times, the $La\mu^{th}$ phase of the output of the IDFT unit 82 approaches the $a\chi^{th}$ phase in the phase-rotated data symbol. Accordingly, when deciding the arrangement of the symbols of the previous block, the first symbol of the previous block may be put at the $a\chi^{th}$ position to set the CP length $M_{CP}$ to $(N_{ALL} - a\mu)L$ in order that the head symbol of the CP inserted block (i.e., the first symbol at a position to be copied in the CP insertion) becomes a sample close to the phase of the last sample of the previous block.

The $a\chi^{th}$ symbol $d_n^{(k-1)}$ to be put in the $k^{th}$ block becomes the $n^{th}$ symbol in the $k-1^{th}$ block, which is one block before with respect to the $k^{th}$ block. To maintain the phases between the blocks, perform parameter selection may be performed in accordance with the following setting conditions.

Figure 6:
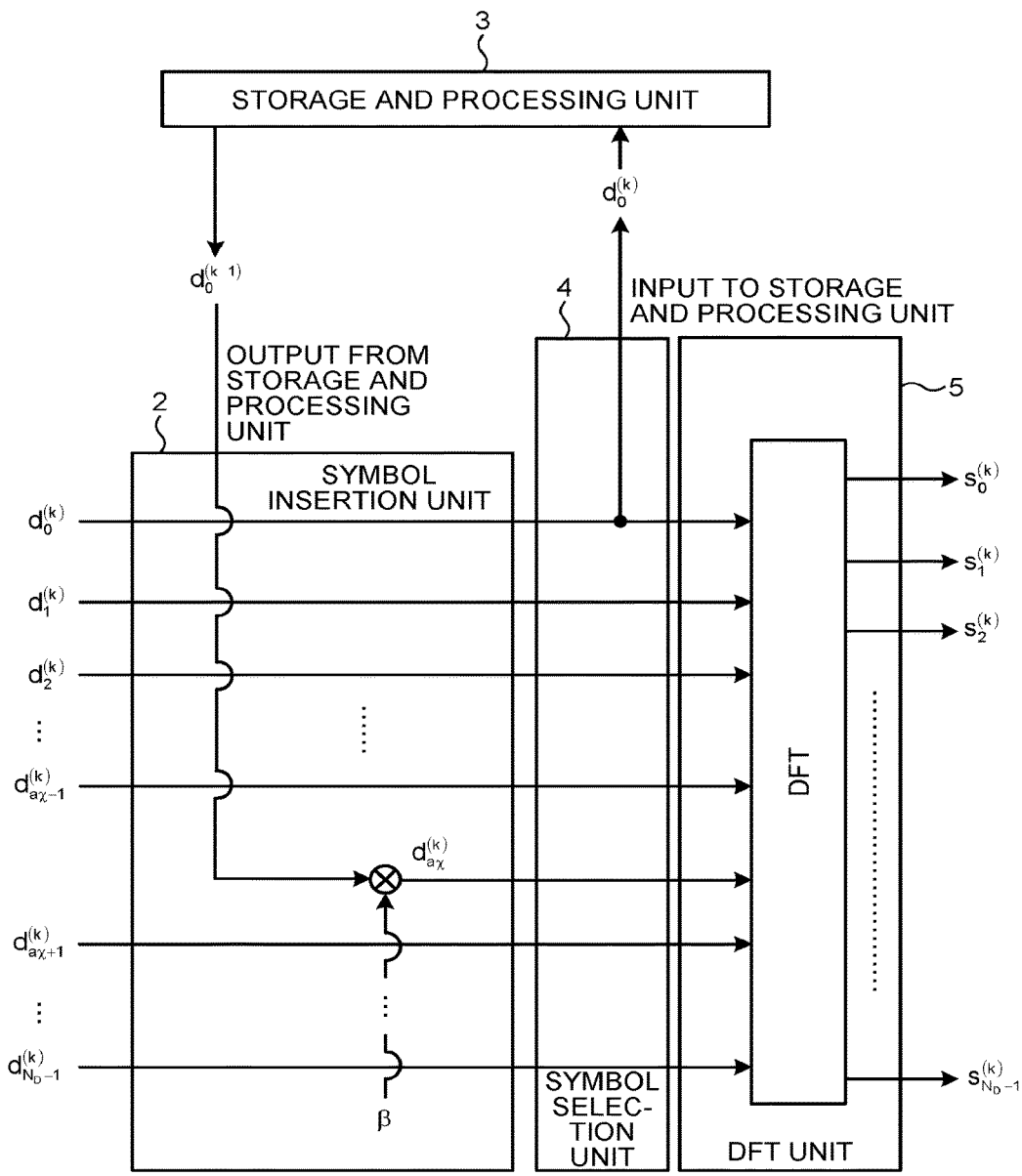
FIG. 6 is a diagram illustrating an example of processing performed by a symbol insertion unit, a storage and processing unit, a symbol selection unit, and a DFT processing unit.
Figure 7:
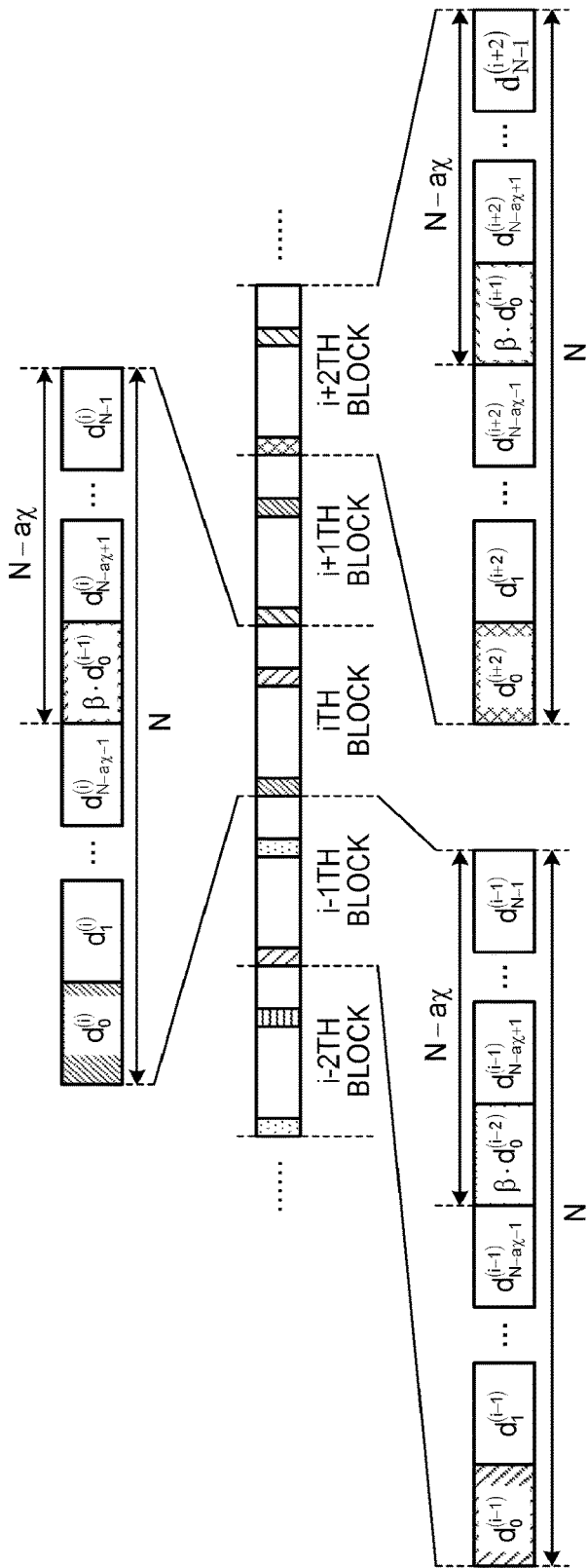
FIG. 7 is a diagram illustrating an example of a configuration of a block signal according to the first embodiment.

Design condition 1: $M_{CP}$ is set as $(N_{ALL} - a\mu)L$
Design condition 2: n=0 and the $a\chi^{th}$ symbol is set as $\gamma \cdot d_0^{(k-1)}$ That is, the $a\chi^{th}$ symbol in the $k^{th}$ block becomes the $0^{th}$ symbol in the $k-1^{th}$ block. FIG. 6 is a diagram illustrating an example of processing the symbol insertion unit 2, the storage and processing unit 3, the symbol selection unit 4, and the DFT unit 5. FIG. 7 is a diagram illustrating an example of a configuration of a block signal according to the present embodiment. The phases between the blocks become continuous as described below. As illustrated in FIG. 6, due to the circularity of an IDFT output, which is explained in the above-mentioned Porat Literature, the last sample of the $k-1^{th}$ block in the time domain approaches the $d_0^{(k-1)}$ phase. Because the head symbol of the CP in the $k^{th}$ block is $d_0^{(k-1)}$ according to the design condition 2, the phase of the last sample in the $k-1^{th}$ block and the phase of the head sample of the CP in the $k^{th}$ block are connected to each other.

Figure 8:
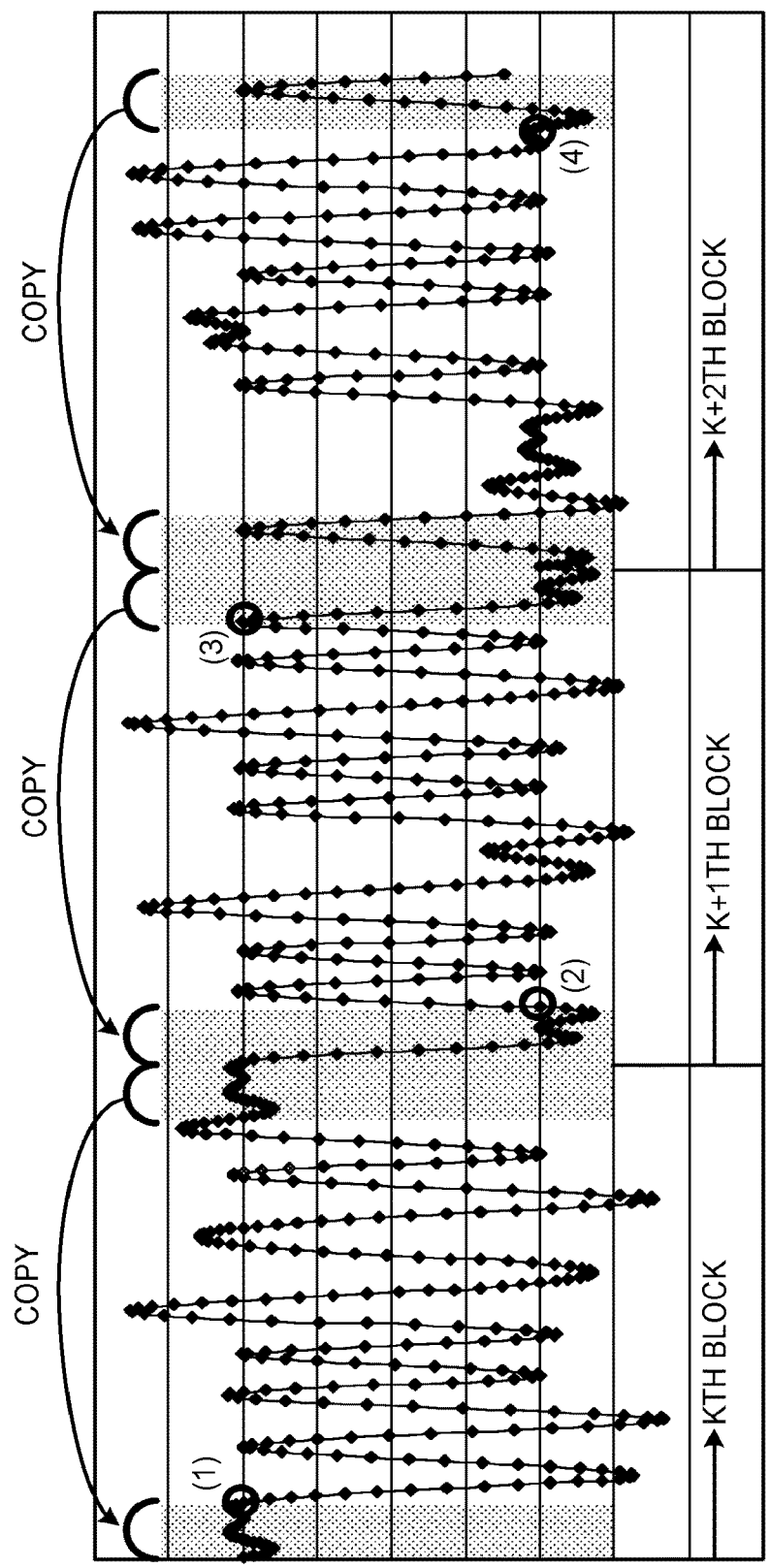
FIG. 8 is a diagram illustrating an example of how data is processed according to the first embodiment.

A specific example is described with reference to the drawings. FIG. 8 is a diagram illustrating an example of data processing performed according to the present embodiment. "COPY" in FIG. 8 indicates copy processing in the CP insertion unit 9 in which the $M_{CP}$ sample at the tail of each block is copied to the head of the block. In the example in FIG. 8, it is assumed that N=24, $N_{ALL}$=32, $M_{CP}$=32, and the oversampling rate is 8 times. Further, it is assumed that $\mu$=4, $\chi$=3, a=7, and $M_{CP}$=(32-7·4)·8=32 is satisfied. In the block symbol, $d_{21}^{(k)}$ may be equal to $\beta \cdot d_0^{(k-1)}$. In FIG. 8, BPSK (Binary Phase Shift Keying) is used as the modulation method. To simplify the description, only a real value of the output of the CP insertion unit 9 is illustrated therein.

It can be seen from FIG. 8 that a sample (3) corresponding to the CP portion in the $K+1^{th}$ block is set to the same phase as that of the first sample (1) in the $K^{th}$ block. Because the last sample (the last sample after interpolation processing (at a point added by interpolation)) in the $K^{th}$ block is a point smoothly connected to the sample (1), the last sample approaches the phase of the sample (1). Because the head of the CP portion in the $K+1^{th}$ block is in the same phase as the sample (1) (the phase of the sample (3)), the phases between the $K^{th}$ block and the $K+1^{th}$ block are connected to each other. Similarly, it can be understood that a sample (4) corresponding to the CP portion in the $K+2^{th}$ block is set to the same phase of the first sample (2) in the $K+1^{th}$ block. Because the last sample in the $K+1^{th}$ block approaches the phase of the sample (2) and the head of the CP portion in the K+2$^{th}$ block is in the same phase as the sample (2) (the phase of the sample (4)), the phases between the K+1$^{th}$ block and the K+2$^{th}$ block are connected to each other. To simplify the description, the processing of the waveform shaping filter unit 6 in the present example is omitted.

By specifying a, µ, and χ so as to satisfy the above setting conditions 1 and 2, the symbol selection position information (the 0$^{th}$ position) and the symbol insertion position information (the aχ$^{th}$ position) can be specified. The symbol selection position information and the symbol insertion position information can be input from outside or can be set beforehand in the transmission device. The symbol selection position information and the symbol insertion position information can be changed after being set beforehand.

Figure 9:
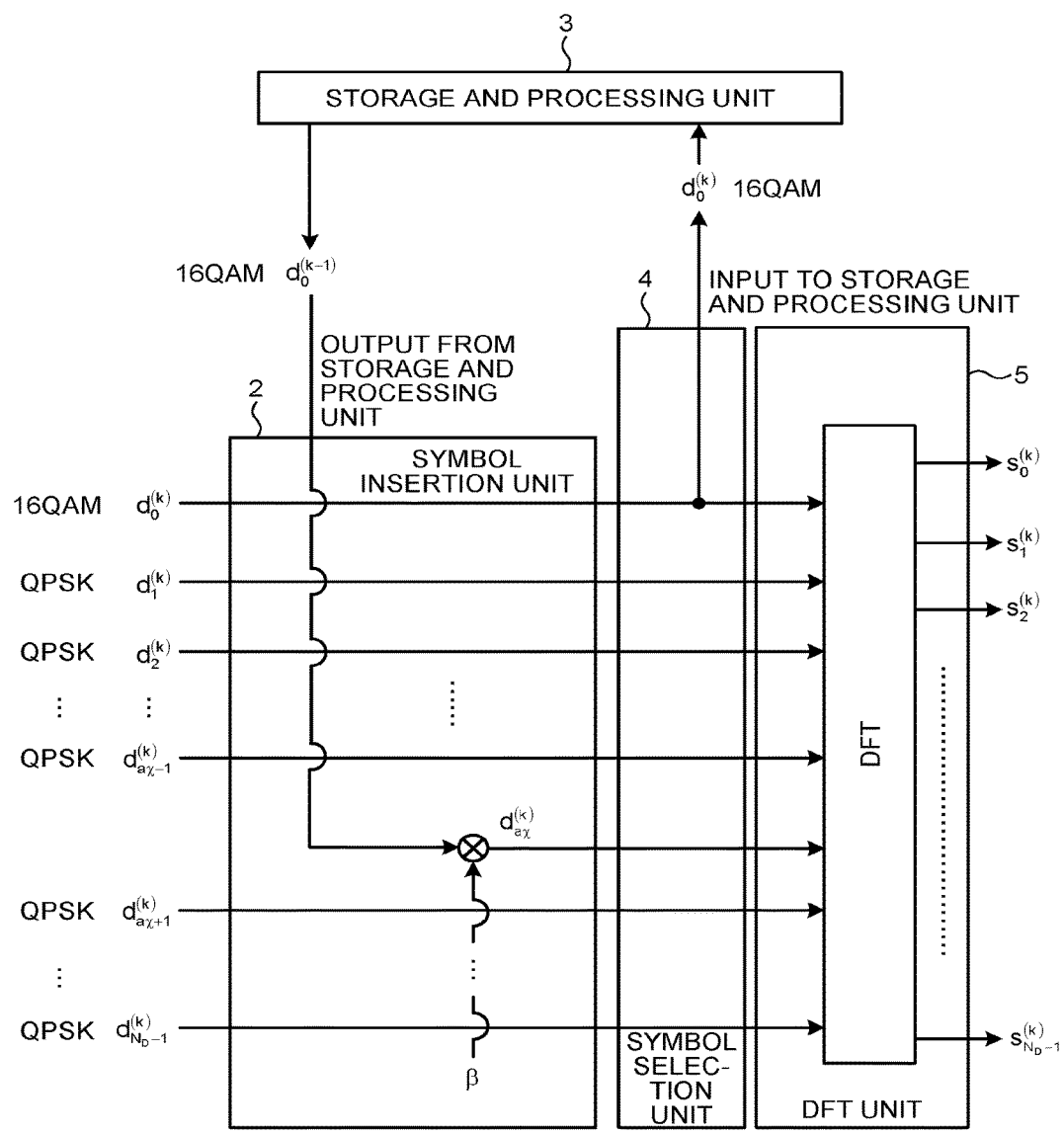
FIG. 9 is a diagram illustrating an example in which different modulation symbols are mixed.

The number of multilevel modulations of $d_n^{(k-1)}$ does not need to be the same as that of other symbols. FIG. 9 is a diagram illustrating an example in which different modulation symbols are mixed. For example, in a case where l≠n and $d_1^{(k-1)}$ is a QPSK symbol, a symbol with a multi-level number equal to or larger than QPSK such as a 16QAM symbol or a 64QAM symbol can be set as $d_n^{(k-1)}$. For example, in the above example, given it is assumed that $d_0^{(k-1)}$ is a 16QAM symbol, l≠0, and l≠aχ, then $d_1^{(k-1)}$ can be set to the QPSK symbol.

If different modulation symbols are mixed up, the following effect can be obtained. For example, when $d_0^{(k-1)}$ is the QPSK symbol, because one symbol in the block is a copy of the symbol from the previous block, the number of bits of the transmission symbol per one block becomes 2(N−1) bits. By setting $d_0^{(k)}$ as the 16QAM symbol, the number of bits of the transmission symbol per one block becomes 2N bits and becomes the number of bits the same as the number of bits when transmitting N QPSK symbols. Because $d_0^{(k)}$ appears in the next block, demodulation accuracy increases when compared with other symbols. Therefore, the value of multilevel modulation of the $d_0^{(k-1)}$ symbol can be set higher than that of other symbols, thereby enabling to increase the number of transmission bits.

As described above, according to the present embodiment, the data symbol at a predetermined selection position in the previous block is held in the storage and processing unit 3; and the symbol insertion unit 2 inserts the data symbol held in the storage and processing unit 3 at a predetermined insertion position of the generated data symbol. The predetermined selection position and the predetermined insertion position are decided such that the phase of the first sample of the block is continuous with the phase of the last sample of the previous block. Therefore, the out-of-band spectrum can be reduced.

The guard-band insertion processing has been performed in the present embodiment. However, the guard-band insertion processing may be omitted.

Second Embodiment

Figure 10:
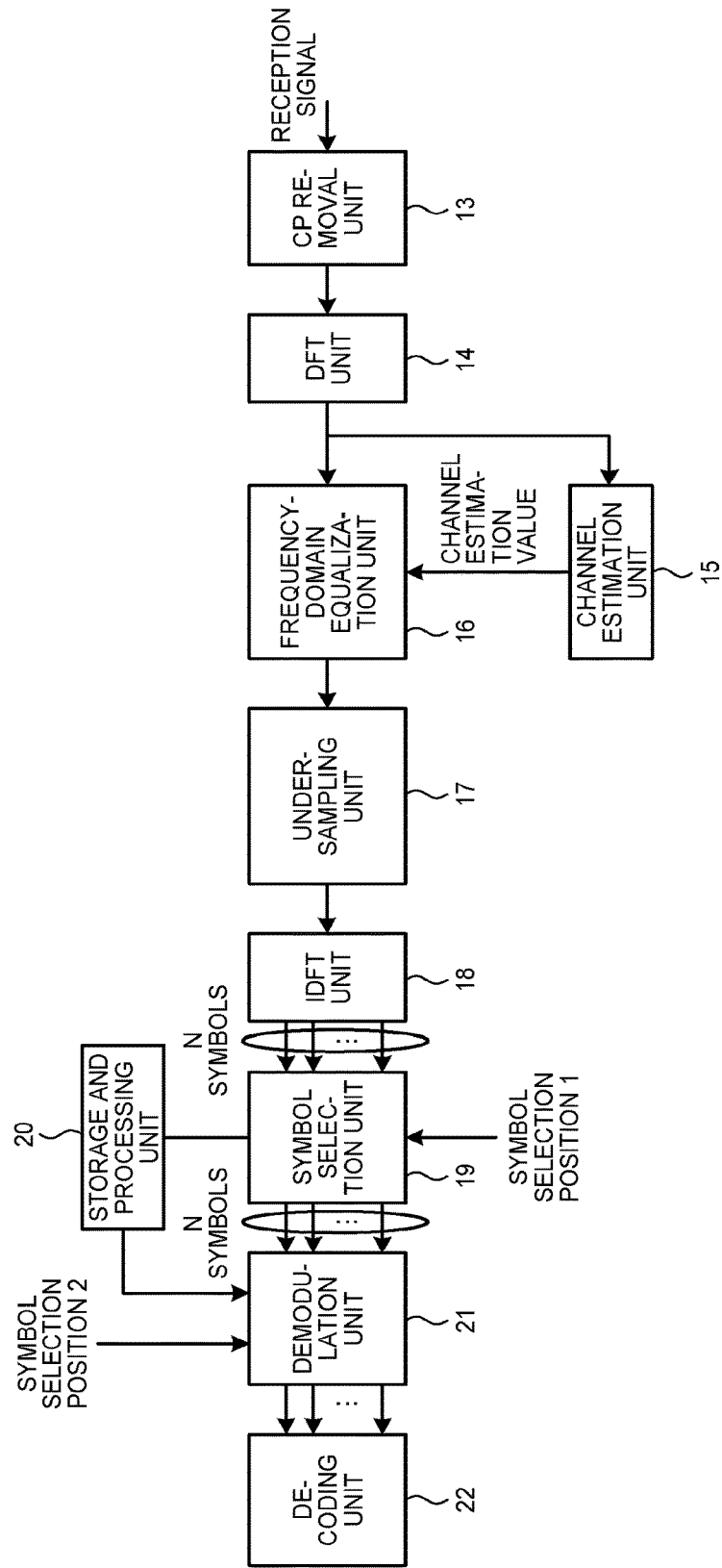
FIG. 10 is a diagram illustrating an example of a functional configuration of a reception apparatus according to a second embodiment.

FIG. 10 is a diagram illustrating an example of functional configuration of a reception apparatus according to a second embodiment of the present invention. The reception apparatus according to the present embodiment receives an SC block signal transmitted by the transmission apparatus described in the first embodiment.

As illustrated in FIG. 10, the reception apparatus according to the present embodiment includes a CP removal unit 13, a DFT unit 14, a channel estimation unit 15, a frequency-domain equalization unit 16, an undersampling unit 17, an IDFT unit 18, a symbol selection unit 19, a storage and processing unit 20 (storage unit), a demodulation unit 21, and a decoding unit 22.

A reception signal is input to the DFT processing unit 14 after the CP removal is performed on the reception signal by the CP removal unit 13. The DFT processing unit 14 converts the reception signal into the frequency domain signal. The channel estimation unit 15 performs estimation of a channel in accordance with the frequency domain signal, and inputs an estimation value of the channel to the frequency-domain equalization unit 16. The frequency-domain equalization unit 16 performs equalization processing by using the frequency domain signal and the estimation value of the channel. The undersampling unit 17 performs undersampling (downsampling) on the signal on which the equalization processing has been performed, and it extracts frequency components including information. The IDFT unit 18 converts the frequency components extracted by the undersampling unit 17 into time domain signal. The symbol selection unit 19 selects the n$^{th}$ symbol in the time domain signal output from the IDFT unit 18, and stores the n$^{th}$ symbol in the storage and processing unit 20. The symbol stored in the storage and processing unit 20 is read by the demodulation unit 21 when the next block is demodulated. The demodulation unit 21 performs demodulation of N symbols. At this time, in order to increase demodulation accuracy, the symbol stored in the storage and processing unit 20 can be used when performing demodulation by using the m$^{th}$ time domain signal. For example, given that the example described in the first embodiment is used, n=0 is set, and the demodulation unit 21 performs demodulation of the 0$^{th}$ signal of the time domain signal in the previous block by using the aχ$^{th}$ time domain signal.

For example, the time domain signal output from the IDFT unit 18 on the reception side is represented by the following expression (8).

[Expression 8]

$$v^{(k)} = [v_0^{(k)}, v_1^{(k)}, v_2^{(k)}, \ldots, v_{N-1}^{(k)}]^T \tag{8}$$

At this time, demodulation can be performed, for example, according to the following expression (9).

[Expression 9]

$$\hat{d}_i^{(k)} = \underset{d_i^{(k)} \in D}{\operatorname{argmin}} |v_i^{(k)} - d_i^{(k)}|^2 \tag{9}$$

$$0 \leq i \leq N-1,$$
$$i \neq a\chi$$

In the above expression (9), D becomes a candidate of a value of a symbol d(hat)$_0^{(k)}$. For example, in the case of BPSK, the following expression (10) is established, and in the case of QPSK, the following expression (11) is established.

[Expression 10]

$$D \in \{+1, -1\} \tag{10}$$

[Expression 11]

$$D \in \left\{ \frac{1+j}{\sqrt{2}}, \frac{1-j}{\sqrt{2}}, \frac{-1+j}{\sqrt{2}}, \frac{-1-j}{\sqrt{2}} \right\} \tag{11}$$

In the case where i=aχ, demodulation of the $0^{th}$ symbol in the previous block can be performed by using $V_{a\chi}^{(k)}$ according to a method represented by the following expression (12).

[Expression 12]

$$\hat{d}_0^{(k-1)} = \underset{d_0^{(k-1)} \in D}{\mathrm{argmin}}\, |v_{a\chi}^{(k)} - \beta \cdot d_0^{(k-1)}|^2 + |v_0^{(k-1)} - d_0^{(k-1)}|^2 \quad (12)$$

In the present embodiment, it is assumed that $d_0^{(k-1)}$ is the symbol with a multi-level number same as $d_i^{(k-1)}$ when i≠0 is set. However, as described in the first embodiment, the symbol with a multi-level number different from $d_i^{(k-1)}$ can be used as $d_0^{(k-1)}$.

In the reception apparatus according to the present embodiment, the $n^{th}$ symbol of the time domain signal output from the IDFT unit 18 is stored in the storage and processing unit 20, and the demodulation unit 21 performs demodulation by using the symbol stored in the storage and processing unit 20 when the next block is demodulated. Therefore, when receiving the signal transmitted from the transmission apparatus according to the first embodiment, the transmitted data symbol can be demodulated, and the symbol stored in the storage and processing unit 20 is used when performing demodulation by using the $m^{th}$ time domain signal, thereby enabling to increase demodulation accuracy.

Third Embodiment

Figure 11:
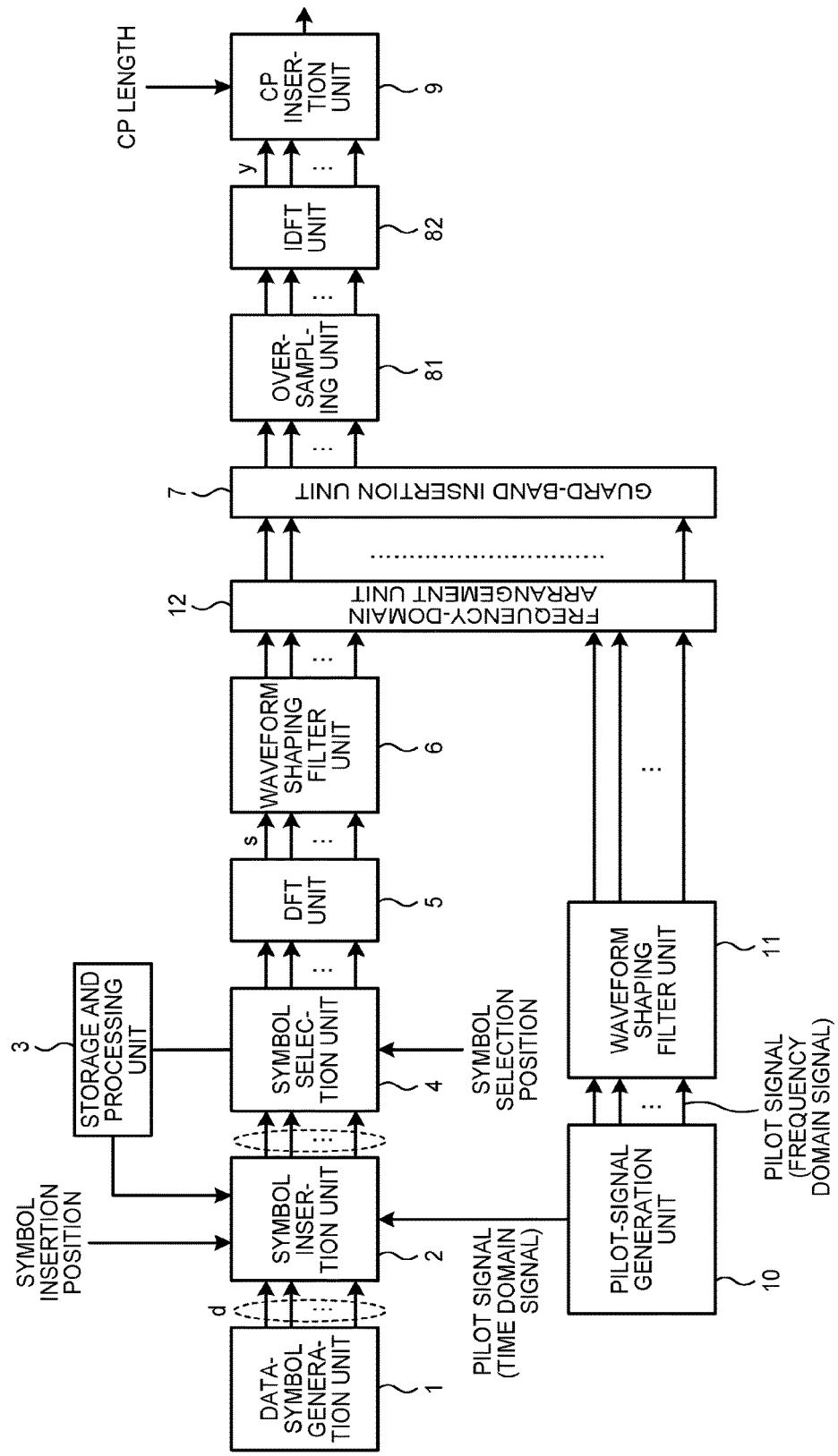
FIG. 11 is a diagram illustrating an example of functional configuration of a transmission apparatus according to a third embodiment.

FIG. 11 is a diagram illustrating an example of functional configuration by a transmission apparatus according to a third embodiment of the present invention. As illustrated in FIG. 11, the transmission apparatus according to the third embodiment is the same as the transmission apparatus according to the first embodiment illustrated in FIG. 4, except for adding a pilot-signal generation unit 10, a waveform shaping filter unit 11, and a unit for arrangement on frequency-domain (frequency-domain arrangement unit) 12 thereto. Constituent elements having the same functions as those of the first embodiment are denoted by like reference signs of the first embodiment and redundant explanations thereof will be omitted. Parts different from those of the first embodiment are explained below.

In the SC block transmission, a pilot signal is used in some cases for estimation of a channel and synchronous processing; and in the frequency domain, pilot signals and DFT-processed data symbols are put. In the present embodiment, an example in which pilot signals are put in the frequency domain in this manner is described.

The data symbol generation unit 1 generates a data symbol as in the data symbol generation unit 1 according to the first embodiment. However, the number of data symbols generated per one block is N+$N_T$ ($N_T$ is the number of pilot symbols per one block).

The pilot-signal generation unit 10 generates a pilot signal in the time domain (pilot signal (time domain signal)) and a pilot signal in the frequency domain (pilot signal (frequency domain signal)); inputs the pilot signal (time domain signal) to the symbol insertion unit 2; and inputs the pilot signal (frequency domain signal) to the waveform shaping filter unit 11. The waveform shaping filter unit 11 performs waveform shaping on the input pilot signal (frequency domain signal) and inputs the waveform-shaped signal to the frequency-domain arrangement unit 12.

The symbol insertion unit 2 inserts the symbols stored in the storage and processing unit 3 (the symbol of the previous block) into the data symbol as illustrated in the first embodiment. However, at this time, the symbol to be inserted is corrected and inserted in accordance with the pilot signal (the time domain signal). The frequency-domain arrangement unit 12 puts the data symbol in the frequency domain output from the waveform shaping filter unit 6 and the pilot signal (the frequency domain signal) output from the waveform shaping filter unit 11 in the frequency domain, and outputs the data symbol and the pilot signal to the guard-band insertion unit 7.

Figure 12:
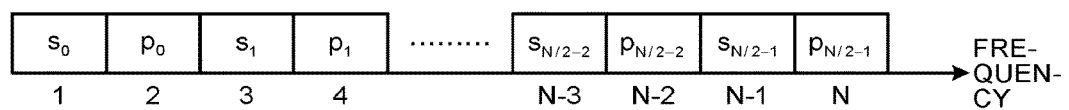
FIG. 12 is a diagram illustrating an example of the arrangement of data symbols and pilot signals according to the third embodiment.

As a specific example, it is assumed that the total number of symbols in one block is N, the number of symbols of the pilot signal in one block is $N_T$=N/2, and the number of data symbols in one block is $N_D$=N/2. FIG. 12 is a diagram illustrating an arrangement example of data symbols and pilot signals under the condition described above. In FIG. 12, $s_0, s_1, \ldots, s_{N/2-1}$ denote data symbols (an output of the DFT unit 5) in the frequency domain, and $p_0, p_1, \ldots, p_{N/2-1}$ denote pilot signals. In FIG. 12, there are alternate arrangements of the data symbols and the pilot signals. FIG. 12 illustrates only an example, and the arrangement position and the number of pilot signals are not limited to the example illustrated in FIG. 12.

In the present embodiment, because the pilot symbols and the data symbols are multiplexed in the frequency domain, when the aμ$^{th}$ sample is set as $d_n^{(k-1)}$ in the time domain signal, which is an output of the IDFT unit 82, the time domain signal of the pilot signals needs to be taken into consideration. When it is assumed that the time domain signals of the pilot symbols are $q_0, q_1, \ldots, q_{NALL-1}$, then aχ(k') is a symbol insertion position in the time domain, and b and c are phase rotation and amplitude adjustment performed such that the symbol at a predetermined position in the time domain signal, which is the output of the IDFT unit 82, becomes $d_n^{(k-1)}$, the symbol $d_{a\chi}^{(k)}$ is set according to the following expression (13).

[Expression 13]

$$d_{a\chi}^{(k)} = cd_n^{(k-1)} - bq_{a\mu+N/2} \quad (13)$$

Values of b and c are complex numbers or real numbers and are decided in accordance with the pilot insertion position in the frequency domain and the symbol arrangement position in the previous block.

A specific example is described below. In order to simplify the description, it is assumed that the number of pilot symbols is $N_T$=N/2 and the number of data symbols is $N_D$=N/2. $N_{ALL}$=N is also assumed. The pilot symbol put in the frequency domain is represented by the following expression (14) and a DFT matrix is represented by the following expression (15).

[Expression 14]

$$p_z = [0, p_0, 0, p_1, 0, \ldots, 0, p_{N_T-1}]^T \quad (14)$$

[Expression 15]

$$[w_N]_{m,n} = \frac{e^{-j2\pi mn/N}}{\sqrt{N}}, 0 \le n \le N-1, 0 \le m \le N-1 \quad (15)$$

At this time, the pilot symbol in the time domain becomes as represented by the following expression (16).

[Expression 16]

$$q = [q_1^T, -q_1^T]^T = W_N^H P_z \quad (16)$$

In the above expression (16), $A^H$ denotes Hermitian Transpose of a matrix A. Given it is assumed that the DFT-processed data signal (the output of the waveform shaping filter unit 6), which is put in the frequency domain, is represented by the following expression (17), then the time domain signal of the data signal becomes as represented by the following expression (18).

[Expression 17]

$$s_z = [s_0, 0, s_1, 0, s_2, 0, \ldots, 0, s_{N_D-1}, 0]^T \quad (17)$$

[Expression 18]

$$t = \left[\frac{t_1^T}{\sqrt{2}}, \frac{t_1^T}{\sqrt{2}}\right]^T = W_N^H s_z \quad (18)$$

Further, $t_1$ is a vector indicating $N_D$ data symbols as represented by the following expression (19). Further, a is a vector represented by the following expression (20).

[Expression 19]

$$t_1 = [d_0, d_1, \ldots, d_{N_D-1}]^T \quad (19)$$

[Expression 20]

$$s = [s_0, s_1, \ldots, s_{N_D-1}]^T = W_{N/2} t_1 \quad (20)$$

A signal, obtained by multiplexing the pilot signal and the DFT-processed data signal in the frequency domain, becomes as represented by the following expression (21). The time domain signal of the multiplexed signal becomes as represented by the following expression (22).

[Expression 21]

$$r = p_z + s_z \quad (21)$$

[Expression 22]

$$y = W_N^H r = W_N^H (p_z + s_z) = t + q \quad (22)$$

It is assumed that $M_{CP}$ is ($N_{ALL}/2 - a\mu$) and the head signal of the CP is set as the 0$^{th}$ symbol of the previous block as in the example described in the first embodiment. It is also assumed that the oversampling is not performed here and that L=1 is set. The waveform shaping filter unit 6 is a solid filter (Rectangular filter) for a signal band. If $d_n^{(k-1)}$ is put at the $a\chi^{th}$ position, the phase of $a\mu^{th}$ sample in an output of the IDFT unit 82 needs to be set so as to approach the phase of $d_n^{(k-1)}$. To simplify the description, it is assumed that $N_{ALL}=N$ here. Given it is assumed that N is an even number and $0 \leq a \leq N/(2\mu)-1$ is set, then the following expression (23) is established.

[Expression 23]

$$\frac{2a\mu}{N} = \frac{a\chi}{N/2} \quad (23)$$

Figure 13:
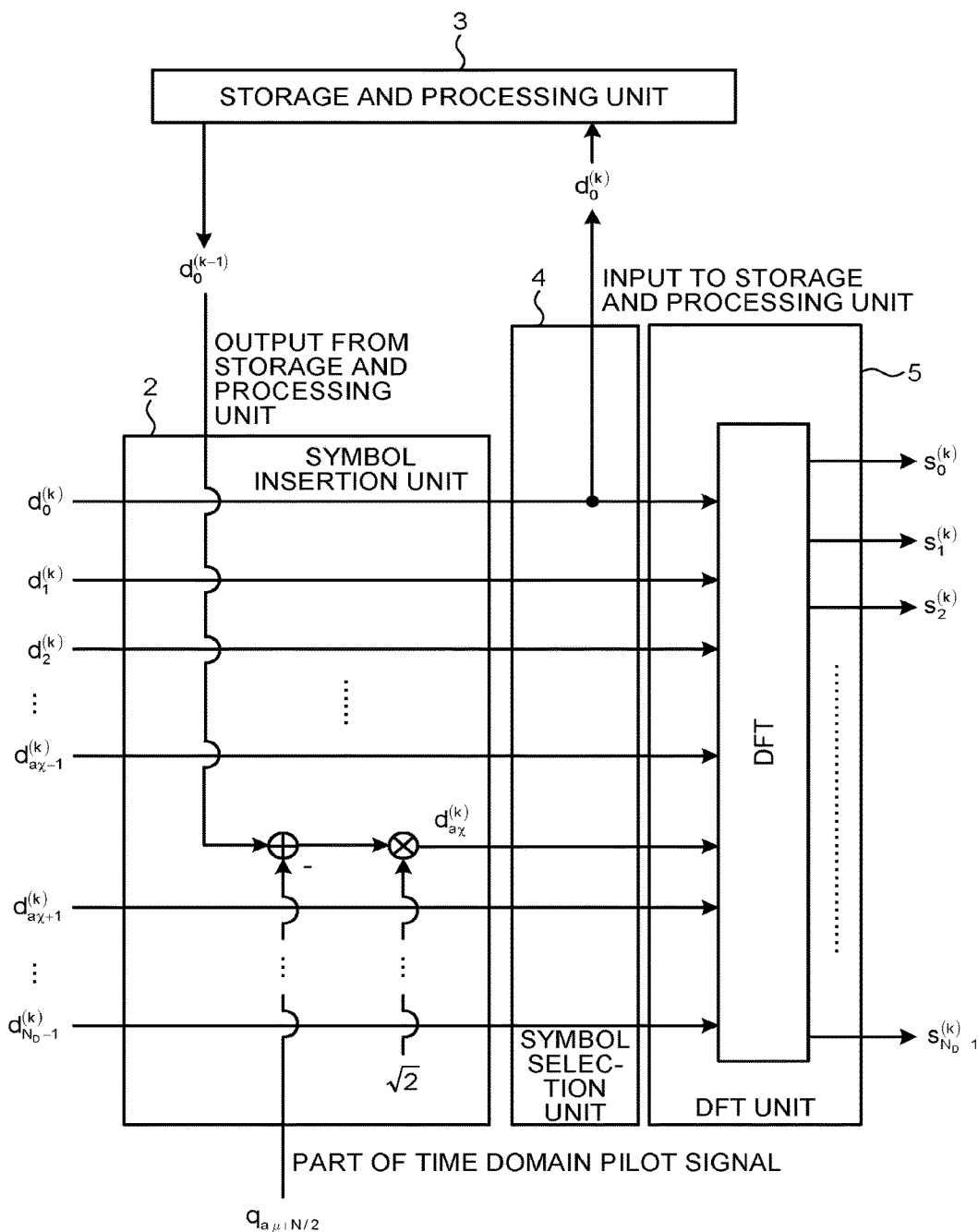
FIG. 13 is a diagram illustrating an example configuration of a signal according to the third embodiment.

In the above example, if $y_{a\chi+N/2}^{(k)} = d_0^{(k-1)}$ is set, the signal indicated by the following expression (24) may be generated. FIG. 13 is a diagram illustrating an example configuration of the signal according to the present embodiment.

[Expression 24]

$$d_{ax}^{(k)} = \sqrt{2}(d_0^{(k-1)} - q_{a\mu+N/2}) \quad (24)$$

Because $y_{a\mu}^{(k)}$ becomes as represented by the following expression (25), when selecting the pilot signals (pilot sequence) $p_0, p_1, \ldots, p_{N/2-1}$, it is desirable to select a pilot sequence such that peak power in $y_{a\mu}^{(k)}$ is not amplified.

[Expression 25]

$$y_{a\mu}^{(k)} = d_0^{(k-1)} - q_{\mu+N/2} + q_{a\mu} \quad (25)$$

In order to suppress the peak power of $y_{a\mu}^{(k)}$, the pilot sequence may be searched by using an evaluation formula, for example, represented by the following expression (26). In the following expression (26), it is assumed that Q denotes a candidate of the pilot sequence and E[•] denotes an average, and averaging is performed over all the candidates of the $d_0^{(k-1)}$ symbols. For example, in the case of BPSK, averaging is performed by using all the candidates represented by the above expression (10). In the case of QPSK, averaging is performed by using all the candidates represented by the expression (11).

[Expression 26]

$$q^* = \underset{q \in Q}{\mathrm{argmin}} E\left[\left|d_0^{(k-1)} - q_{a\mu+N/2} + q_{a\mu}\right|\right] \quad (26)$$

In the above example, an example in which the guard band is not included is described. However, when the guard band is included, $\mu$ and $\chi$ that satisfy the following expressions (27) and (28) may be obtained. In the following expressions (27) and (28), $0 \leq a \leq N_D/a - 1$ is established.

[Expression 27]

$$\frac{2a\mu}{N_{ALL}} = \frac{a_\chi}{N_D} \quad (27)$$

[Expression 28]

$$d_{ax}^{(k)} = cd_0^{(k-1)} - bq_{a\mu+N/2} \quad (28)$$

Figure 14:
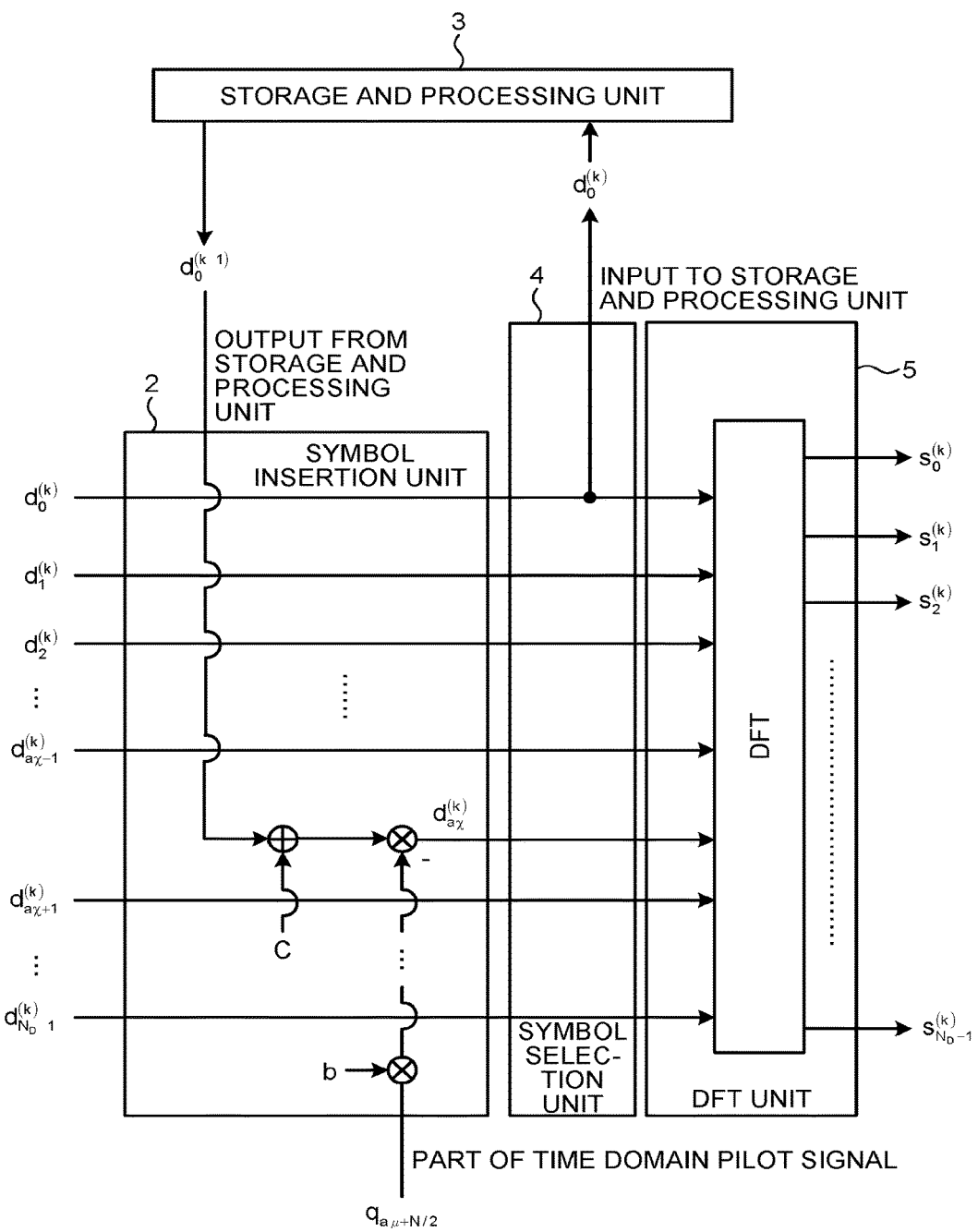
FIG. 14 is a diagram illustrating an example configuration of a signal according to the third embodiment in which a guard band is included.

As in the above example, the pilot sequence can be obtained by using the following expression (29) such that the peak power does not increase. FIG. 14 is a diagram illustrating an example configuration of a signal according to the present embodiment in which a guard band is included.

[Expression 29]

$$q^* = \underset{q \in Q}{\mathrm{argmin}} E\left[\left|d_0^{(k-1)} - q_{a\mu+N/2} + q_{a\mu}\right|\right] \quad (29)$$

As described above, in the present embodiment, when the pilot signal is multiplexed in the frequency domain, the data symbol at a predetermined selection position in the previous block is held in the storage and processing unit 3 as described in the first embodiment; and the symbol insertion unit 2 inserts the data symbol held in the storage and processing unit 3 at the predetermined insertion position of the data symbol, while taking the time domain signal of the pilot signal into consideration. Next, the predetermined selection position and the predetermined insertion position are decided such that the phase of the first sample of the block is continuous with the phase of the last sample of the previous block. Therefore, the out-of-band spectrum can be reduced as in the first embodiment, when the pilot signal is to be multiplexed.

Fourth Embodiment

Figure 15:
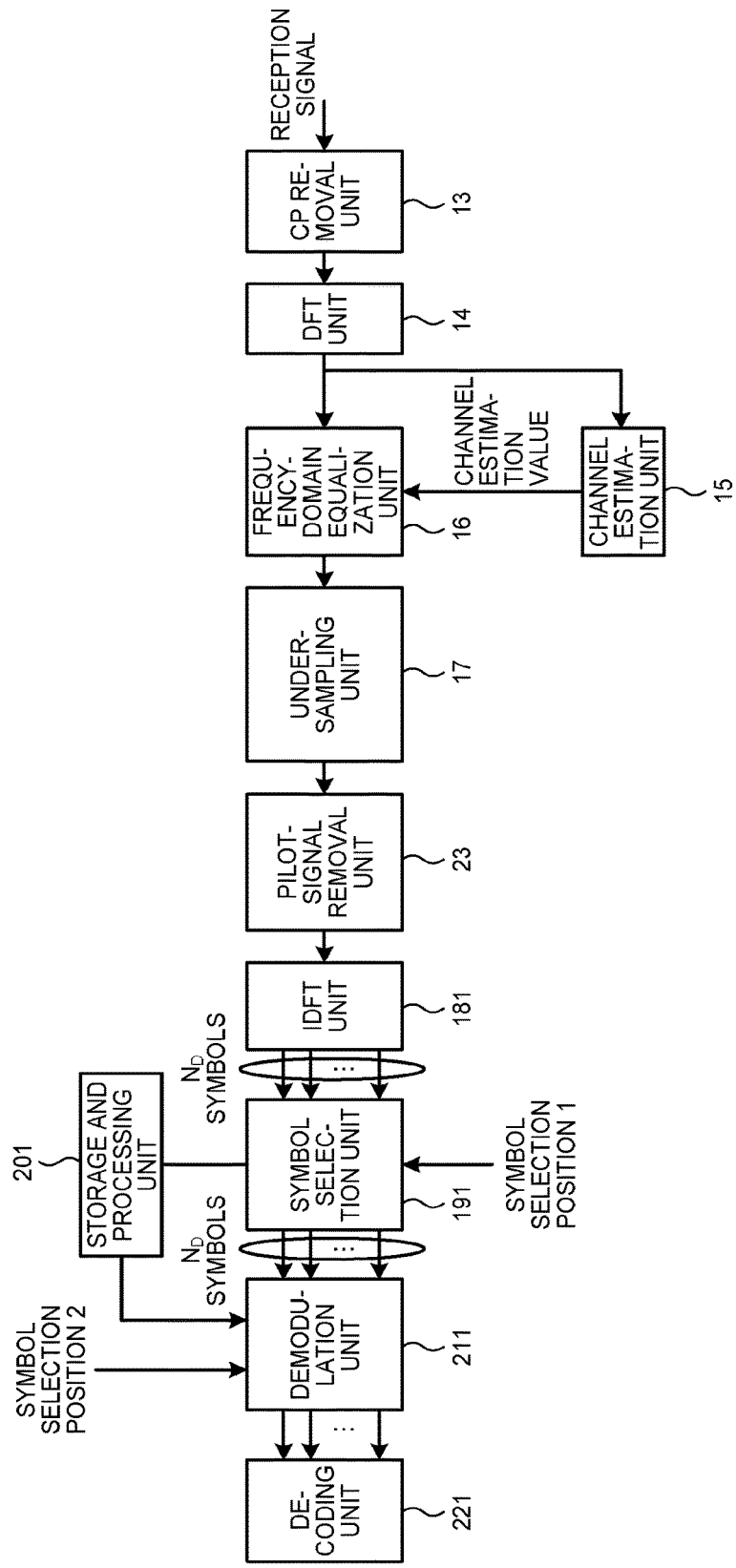
FIG. 15 is a diagram illustrating an example of a functional configuration of a reception apparatus according to a fourth embodiment.

FIG. 15 is a diagram illustrating an example of functional configuration of a reception apparatus according to a fourth embodiment of the present invention. The reception apparatus according to the present embodiment receives an SC block signal transmitted by the transmission apparatus described in the third embodiment.

As illustrated in FIG. 15, the reception apparatus according to the present embodiment includes the CP removal unit 13, the DFT unit 14, the channel estimation unit 15, the frequency-domain equalization unit 16, the undersampling unit 17, a pilot-signal removal unit 23, an IDFT unit 181, a symbol selection unit 191, a storage and processing unit 201 (storage unit), a demodulation unit 211, and a decoding unit 221. Constituent elements having the same functions as those of the reception apparatus according to the second embodiment are denoted by like reference signs of the second embodiment and redundant explanations thereof will be omitted.

The pilot-signal removal unit 23 performs removal of the pilot signal on the signal on which the undersampling has been performed. The IDFT unit 181 converts a signal on which removal of the pilot signal has been performed to a time domain signal. The symbol selection unit 191 selects the $n^{th}$ symbol and stores the $n^{th}$ symbol in the storage and processing unit 201. The symbol stored in the storage and processing unit 201 is read by the demodulation unit 211 when the next block is demodulated. The demodulation unit 211 performs demodulation of N symbols. At this time, in order to increase the demodulation accuracy, the symbol stored in the storage and processing unit 201 can be used when performing demodulation by using the $m^{th}$ time domain signal. For example, if the example described in the first embodiment is used, n=0 is set and the demodulation unit 211 performs demodulation of the $0^{th}$ signal of the time domain signal in the previous block by using the $a\chi^{th}$ time domain signal. Specifically, in a case where i=ax, demodulation is performed by using $V_{a\chi}^{(k)}$ according to the following expression (30).

[Expression 30]

$$\hat{d}_0^{(k-1)} = \underset{d_0^{(k-1)} \in D}{\arg\min} |v_{a\chi}^{(k)} - c \cdot d_0^{(k-1)} + bq_{a\mu+N/2}|^2 + |v_0^{(k-1)} - d_0^{(k-1)}|^2 \quad (30)$$

As described above, in the reception apparatus according to the present embodiment, the pilot-signal removal unit 23 removes the pilot signal in the frequency domain, and stores the $n^{th}$ symbol of the time domain signal output from the IDFT unit 181 in the storage and processing unit 201 as in the reception apparatus according to the second embodiment; and the demodulation unit 211 performs demodulation by using the symbol stored in the storage and processing unit 201 when the next block is demodulated. Therefore, when receiving the signal transmitted from the transmission apparatus according to the third embodiment, the transmitted data symbol can be demodulated, and the symbol stored in the storage and processing unit 201 is used when performing demodulation by using the $m^{th}$ time domain signal, thereby enabling to increase the demodulation accuracy.

In the embodiments described above, an example of performing the SC block transmission has been described. However, the present invention is not limited thereto, and can be applied to a transmission apparatus and a reception apparatus of various systems including a wired system. Further, the present invention has been described by using DFT and IDFT processing; however, the present invention is not limited thereto, and FFT (Fast Fourier Transform) and IFFT (Inverse FFT) can be used, and a plurality of methods can be combined. The configurations of the transmission apparatus and the reception apparatus are not limited to the apparatus configurations described in the respective embodiments.

Further, the out-of-band spectrum reduction effect can be obtained by combining a block that only includes data symbols in the first embodiment with a block in which the data symbols and the pilot symbols are multiplexed in the third embodiment and by using thereof.

Furthermore, an example of inserting a CP as a guard interval has been described in the embodiments described above; however, a guard interval other than the CP can be used. Also in this case, the symbol of the previous block may be put at a predetermined position in the present block.

Fifth Embodiment

Figure 16:
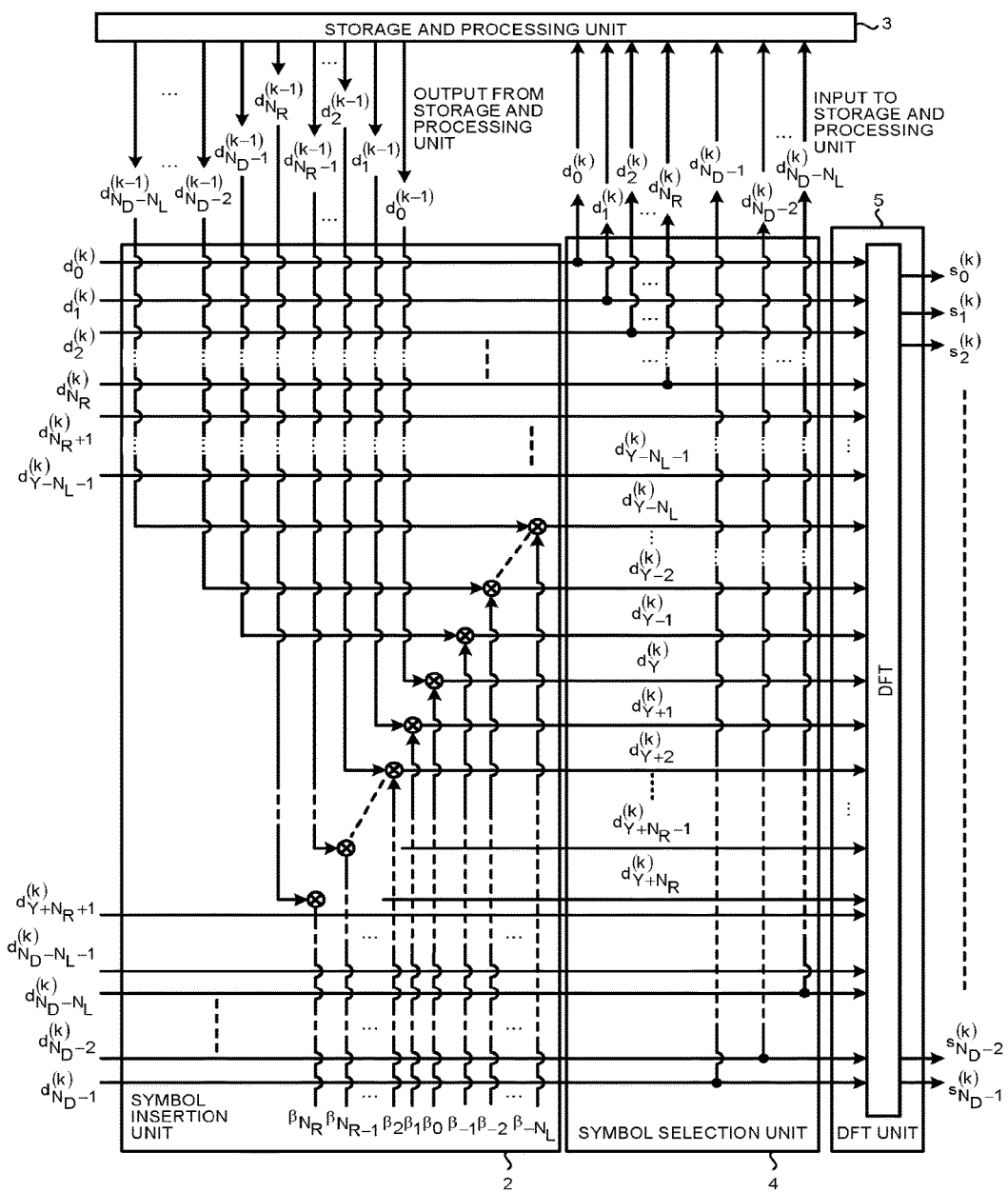
FIG. 16 is a diagram illustrating an example of processing performed by a transmission apparatus according to a fifth embodiment.

FIG. 16 is a diagram illustrating a processing example by a transmission apparatus according to a fifth embodiment of the present invention. Configurations of the transmission apparatus according to the present embodiment are identical to those of the first embodiment. Parts different from those of the first embodiment are explained below.

In the first embodiment, as represented by the expression (1) and the expression (2), it has been described that when it is assumed that $d_m^{(k)} = d_n^{(k-1)}$ and the $(Y+1)^{th}$ symbol in the block is set as the head of a portion to be copied as a CP, which is as a specific example, by setting m=Y and n=0, then reduction of an out-of-band spectrum can be achieved $(Y=N_D-X_{CP})$. Given that a notation of the first embodiment is used, then $X_{CP}=N_D-a\chi$ and $Y=a\chi$ are established. According to the present embodiment, as described below, reduction of the out-of-band spectrum is achieved by not only arranging the symbol with m=Y and n=0 but also arranging a phase-rotated symbol of the symbol in the previous block at previous and next to the symbol. For example, given it is assumed that the total number of symbols is $N_D$, then further reduction of the out-of-band spectrum can be achieved by performing setting as represented by the following expression (31), where $\beta_j$, $\beta_{-j}$, and $\beta_0$ denote phase rotation. $N_L$ denotes the number of symbols constituting a symbol group on the left side of the reference symbol (before the reference symbol); and $N_R$ denotes the number of symbol groups on the right side of the reference symbol (after the reference symbol).

[Expression 31]

$$d_{Y-j}^{(k)} = \beta_{-j} d_{N_D-j}^{(k-1)} \quad j=1,\ldots,N_L$$

$$d_Y^{(k)} = \beta_0 d_0^{(k-1)}$$

$$d_{Y+j}^{(k)} = \beta_j d_j^{(k-1)} \quad j=1,\ldots,N_R \quad (31)$$

$\beta_j$, $\beta_{-j}$, and $\beta_0$ denote phase rotation. Further, in the above expression (31), symbols corresponding to j=1, 2, . . . , $N_L$ are referred to as "second symbol group"; and symbols corresponding to j=1, 2, . . . , $N_R$ are referred to as "first symbol group". In the present embodiment, given that $N_R=N_L=0$ is set, the simple arrangement described in the first embodiment can be obtained.

As illustrated in FIG. 16, the symbol insertion unit 2 inserts symbols obtained by phase-rotating the symbol group of the previous block to between the $Y-N_L^{th}$ symbol generated by the symbol generation unit 1 and the next symbol, when the $k^{th}$ block is generated. That is, $d_0^{(k)}$, $d_1^{(k)}$, . . . , $d_{Y-NL-1}^{(k)}$ are put at the $0^{th}$ to the $Y-N_L-1^{th}$ symbol positions, and thereafter, the first symbol group and the second symbol group, being symbols obtained by phase-rotating the symbol group of the previous block read from the storage and processing unit 3, are inserted. Further, subsequent thereto, $(N_D-1-Y-N_R)$ $d_{Y+NR+1}^{(k)}$, . . . , $d_{ND-1}^{(k)}$ are put. The NL, NR, and ND in the subscript in $d_{Y-NL-1}^{(k)}$, $d_{Y+NR+1}^{(k)}$, and $d_{ND-1}^{(k)}$ denote $N_L$, $N_R$, and $N_D$.

The symbol selection unit 4 outputs the symbols put by the symbol insertion unit 2 to the DFT unit 5, and stores the $0^{th}$ to the $N_R$th symbols $d_0^{(k)}$, $d_1^{(k)}$, . . . , $d_{NR}^{(k)}$ and the $(N_D-N_R)^{th}$ to the $(N_D-1)^{th}$ symbols $d_{ND-NL}^{(k)}$, $d_{ND-NL+1}^{(k)}$, . . . , $d_{ND-1}^{(k)}$ in the storage and processing unit 3. These symbols stored in the storage and processing unit 3 are read when the $(k+1)^{th}$ block signal is generated. When the $(k+1)^{th}$ block signal is generated, the symbol insertion unit 2 generates the first symbol group and the second symbol group in accordance with the symbols read from the storage and processing unit 3, and inserts the symbol groups between the $Y-N_L^{th}$ symbol generated by the symbol generation unit 1 and the next symbol in the same manner as described above.

Figure 17:
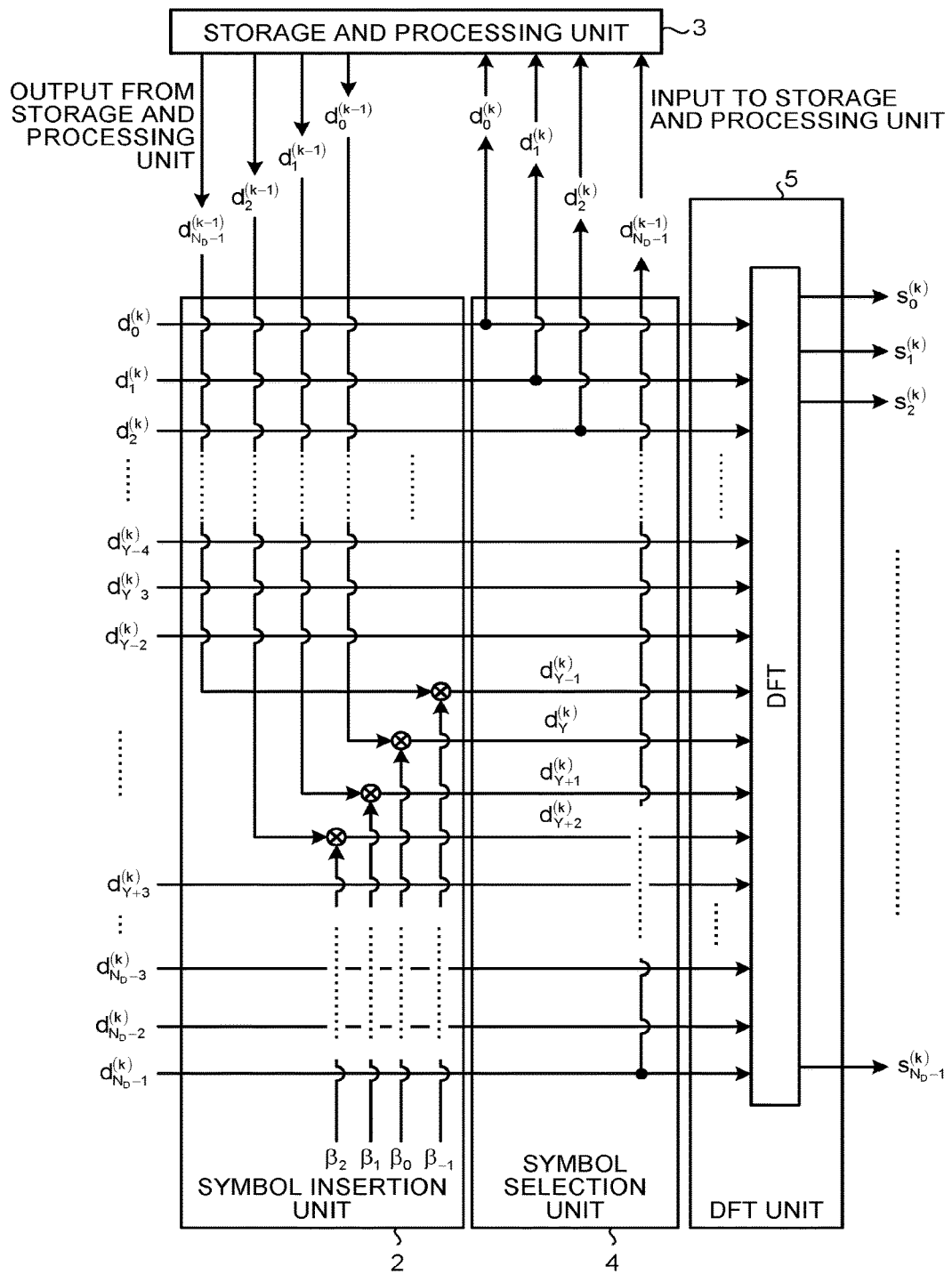
FIG. 17 is a diagram illustrating an example of processing performed according to the fifth embodiment in a case where $N_L=1$ and $N_R=2$.

A specific example in which a numerical value is set to $N_L$ and $N_R$ is described next. FIG. 17 is a diagram illustrating a processing example in a case where $N_L=1$ and $N_R=2$. In this case, the first symbol group and the second symbol groups become as represented by the following expression (32).

[Expression 32]

$$d_{Y-1}^{(k)} = \beta_{-1} d_{N_D-1}^{(k-1)}$$

$$d_Y^{(k)} = \beta_0 d_0^{(k-1)}$$

$$d_{Y+1}^{(k)} = \beta_1 d_1^{(k-1)}$$

$$d_{Y+2}^{(k)} = \beta_2 d_2^{(k-1)} \quad (32)$$

Figure 18:
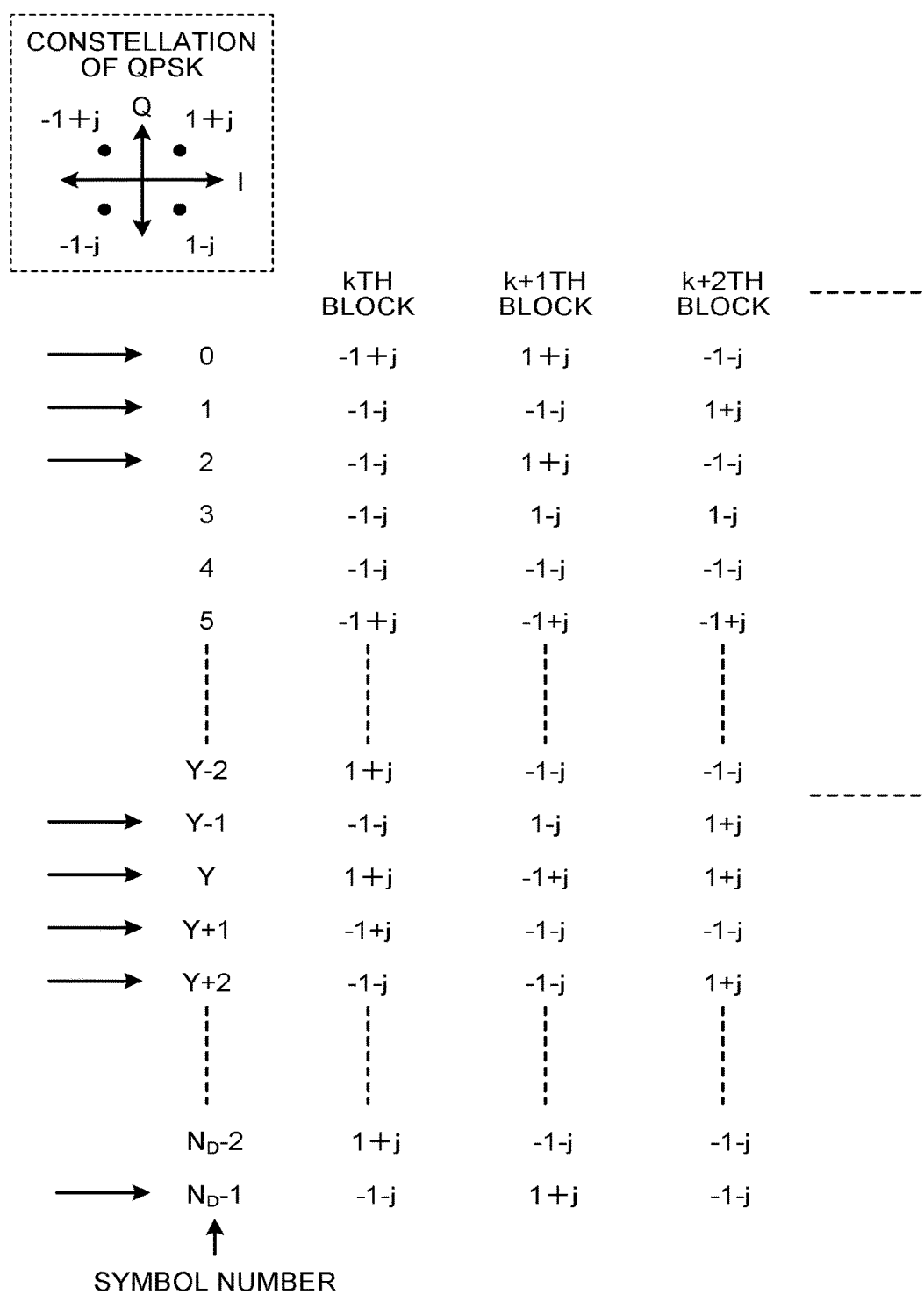
FIG. 18 is a diagram illustrating a specific example of processing performed using a QPSK symbol according to the fifth embodiment.

FIG. 18 is a diagram illustrating a specific example using a QPSK symbol. Given it is assumed that $s_i$ is an output of the DFT unit 5, the $s_i$ becomes as represented by the following expression (33), where L denotes an oversampling rate, N denotes the total number of carriers, and $0_i$ denotes i zeroes.

[Expression 33]

$$s_z = \left[ s_0, s_1, \ldots, s_{\frac{N_D}{2}-1}, 0_{N-N_D+N(L-1)}, s_{N_D/2}, s_{\frac{N_D}{2}+1}, \ldots, s_{N_D-1} \right]^T \quad (33)$$

Figure 19:
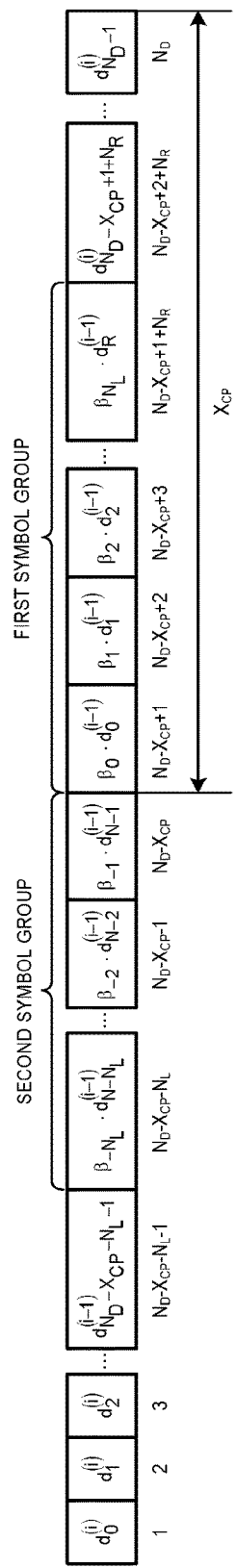
FIG. 19 is a diagram illustrating an example of a data configuration of an $i^{th}$ block in the fifth embodiment.

FIG. 19 is a diagram illustrating an example of data configuration of the $i^{th}$ block in the present embodiment. As illustrated in FIG. 19, the first symbol group obtained by phase-rotating the symbol of the previous block is put subsequent to the $Y(=N_D-X_{CP})+1^{th}$ symbol, being the head of a portion to be copied as a CP. The second symbol group is also put such that the $Y^{th}$ symbol becomes the last of the second symbol group.

Figure 20:
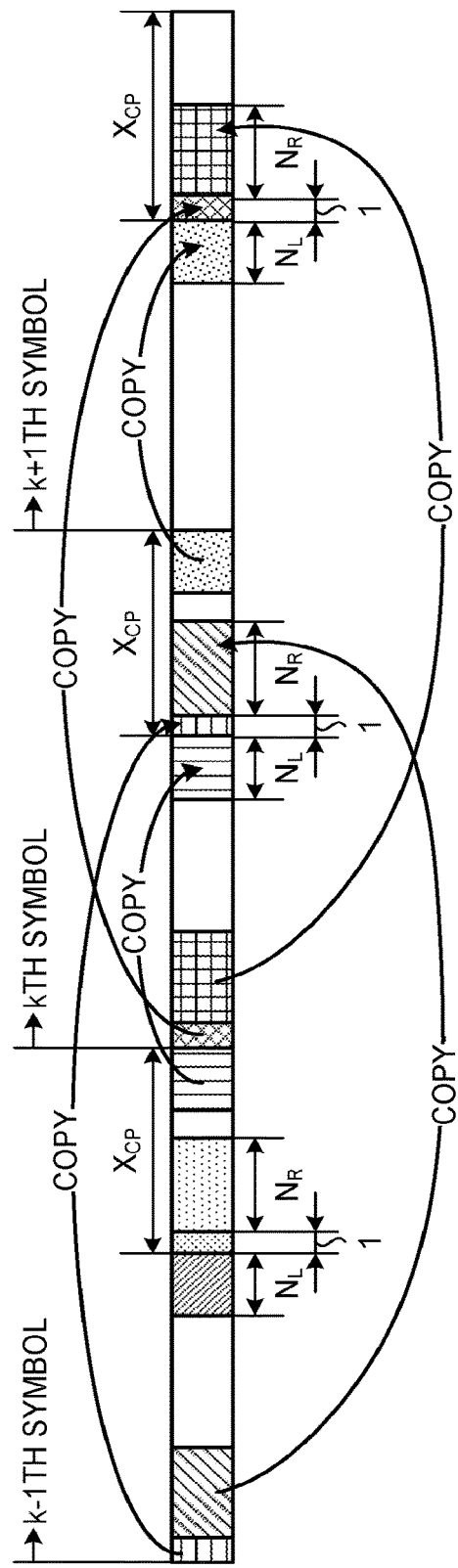
FIG. 20 is a diagram illustrating an example of a data configuration of a block signal for three blocks in the fifth embodiment.

FIG. 20 is a diagram illustrating an example of data configuration of a block signal for three blocks in the present embodiment. In FIG. 20, an arrow described as COPY indicates a part in which the symbol of the previous block is phase-rotated and is put in the next block.

As described in the first embodiment, the last sample in the $k-1^{th}$ block in the time domain approaches the $d_0^{(k-1)}$ phase. Because the head symbol of the CP in the $k^{th}$ block is $d_0^{(k-1)}$, the phase of the last sample in the $k-1^{th}$ block and the phase of the head sample of the CP in the $k^{th}$ block are connected to each other. In the present embodiment, the symbol groups at previous and next to the head symbol of the CP also apply phase rotation to the symbol in the previous block. In the present embodiment, phase rotation is applied to the symbol in the previous block so as to generate the first symbol group and the second symbol group. However, phase rotation may not be applied.

As described above, in the present embodiment, the first symbol group is put subsequent to the head symbol of the portion to be copied as the CP, and the second symbol group is put such that the symbol one before the head symbol of the portion to be copied as the CP becomes the tail of the second symbol group. The first symbol group is generated in accordance with the head portion of the previous block; and the second symbol group is generated in accordance with the tail portion of the previous block. Therefore, the out-of-band spectrum can be reduced more when compared with the first embodiment.

Sixth Embodiment

Figure 21:
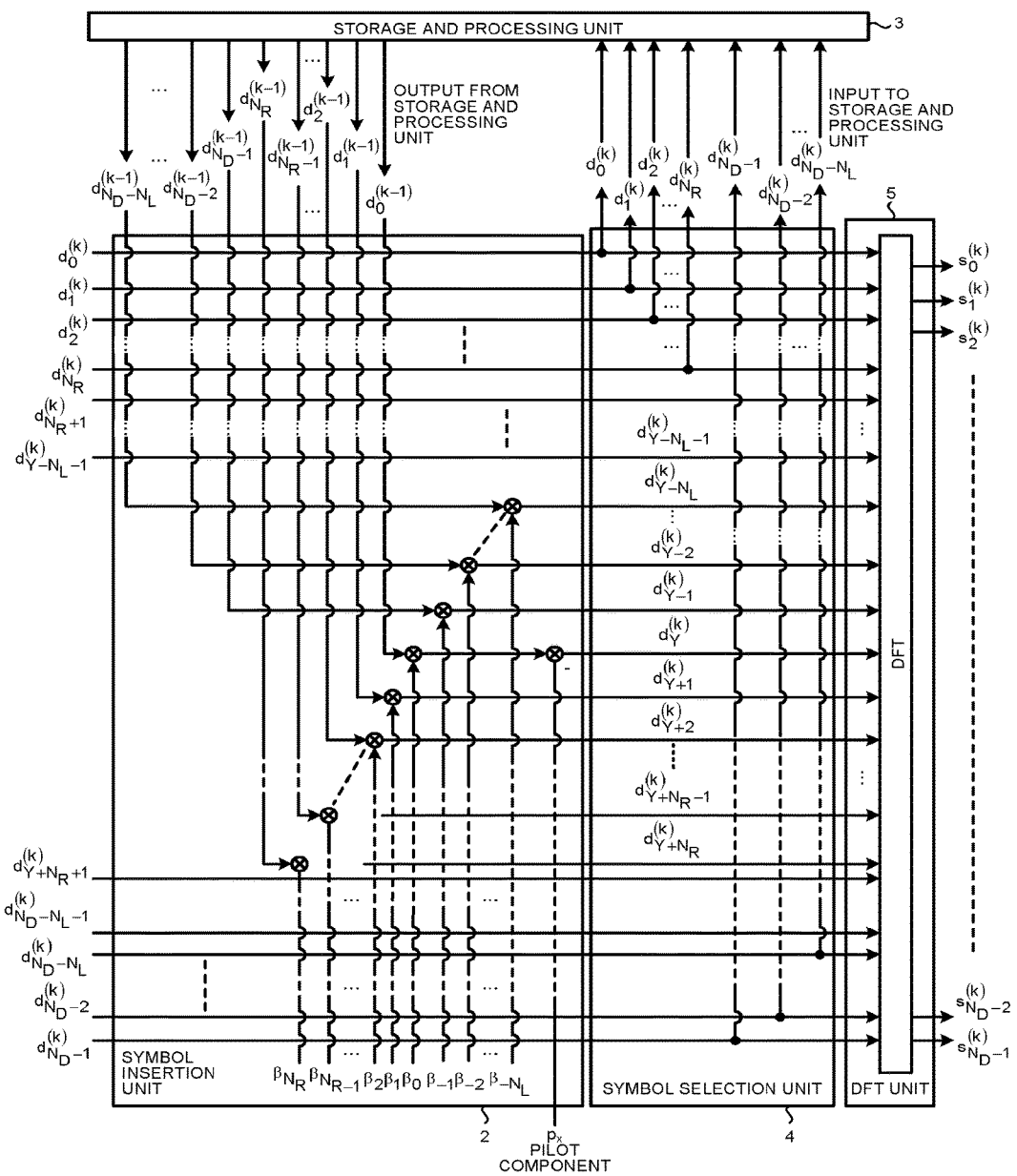
FIG. 21 is a diagram illustrating an example of processing performed by a transmission apparatus according to a sixth embodiment.

FIG. 21 is a diagram illustrating a processing example by a transmission apparatus according to a sixth embodiment of the present invention. Configurations of the transmission apparatus according to the present embodiment are identical to those of the third embodiment. Parts different from those of the third embodiment are explained below.

In the fifth embodiment, not one but a plurality of symbols are copied from the previous block; and the symbol group in accordance with the symbols copied from the previous block is put at the head position of the portion to be copied as the CP and at previous and next to the head position. This method can be applied in a case where the pilot symbols are multiplexed.

As illustrated in FIG. 21, a time domain component of the pilot symbol output from the pilot-signal generation unit 10 is subtracted from the symbol, which is the head of the portion to be copied as the CP, thereby enabling to reduce the out-of-band spectrum even if the pilot symbols are multiplexed. Removal of the time domain component of the pilot symbol can be performed by using the method represented by the expression (28) according to the third embodiment.

Seventh Embodiment

Figure 22:
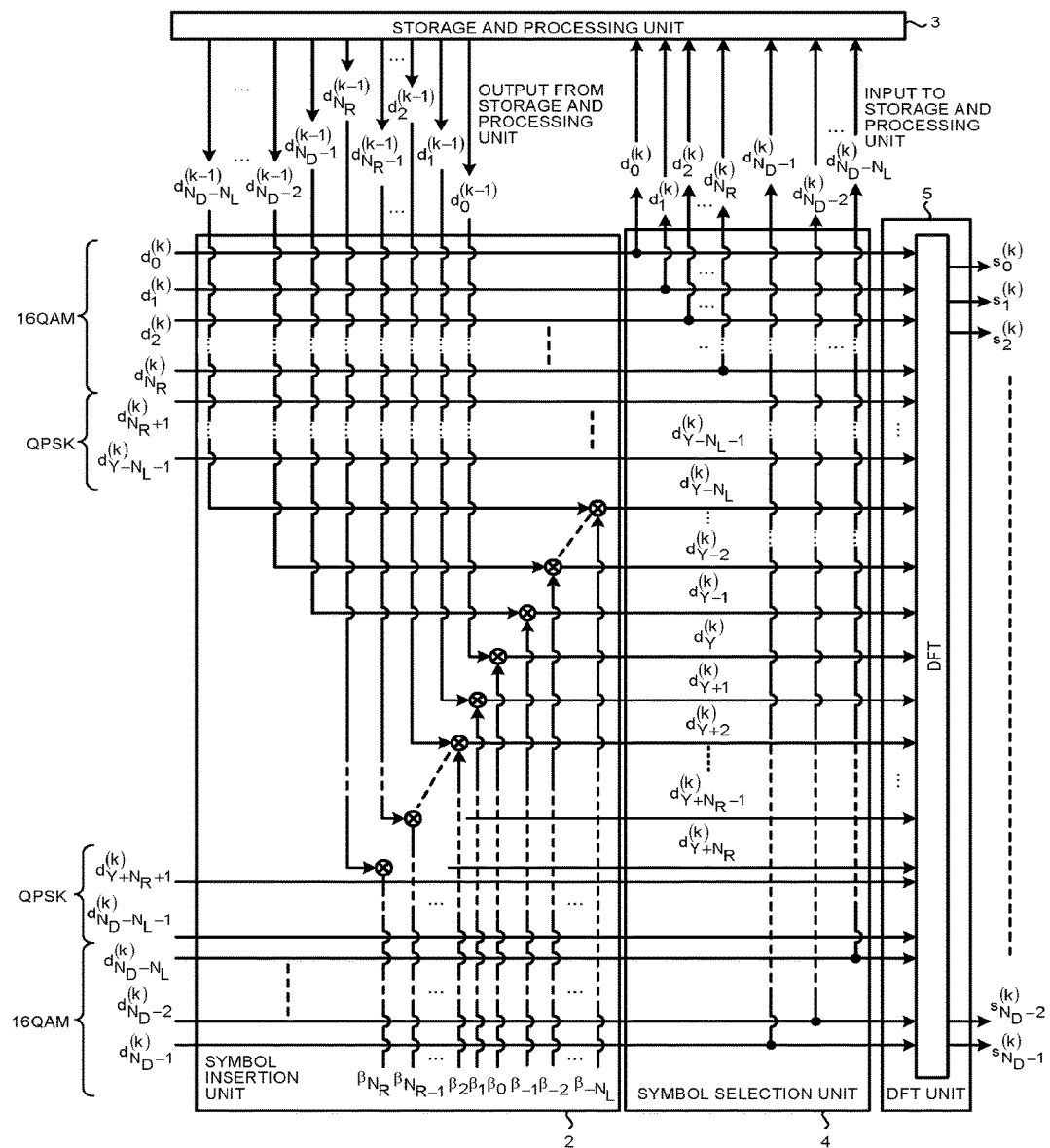
FIG. 22 is a diagram illustrating an example of processing performed by a transmission apparatus according to a seventh embodiment.

FIG. 22 is a diagram illustrating a processing example by a transmission apparatus according to a seventh embodiment of the present invention. Configurations of the transmission apparatus according to the present embodiment are identical to those of the first embodiment. Parts different from those of the first embodiment are explained below.

As described in the first embodiment, the number of multilevel modulation different from that of the first symbol group and the second symbol group described in the fifth embodiment can be mixed and used. FIG. 22 illustrates an example of mixing and using the number of multilevel modulation different from that of the first symbol group and the second symbol group. As illustrated in FIG. 22, for example, symbols with i=0, 1, . . . , $N_R$ in $d_i^{(k)}$ and symbols with i=0, 1, . . . , $N_L$ in $d_{ND-i}^{(k)}$ are modulated by using 16QAM, and other symbols are modulated by using QPSK. The modulation methods of the symbols with i=0, 1, . . . , $N_R$ in $d_i^{(k)}$ and the symbols with i=0, 1, . . . , $N_L$ in $d_{ND-i}^{(k)}$ can be different from each other. For example, when $N_L$=1 and $N_R$=2 are established, $d_0^{(k)}$ can be set as a 64QAM symbol, $d_1^{(k)}$ can be set as a QPSK symbol, and $d_2^{(k)}$ can be set as a 16QAM symbol.

Eighth Embodiment

A reception apparatus according to an eighth embodiment is described next. The reception apparatus according to the present embodiment receives an SC block signal transmitted from the transmission apparatus described in the fifth embodiment. Configurations of the reception apparatus according to the present embodiment are identical to those of the second embodiment.

As described in the fifth embodiment, when the first symbol group and the second symbol group are to be arranged, the first and second symbol groups appear over two blocks. Therefore, in the reception apparatus, demodulation can be performed by using the reception signals for two blocks. For example, when representing the output of the IDFT unit 18 of the reception apparatus by the following expression (34), a demodulation method represented by the following expression (35) can be used.

In the following expressions, $D_j$ is a symbol candidate of $d_j$.

[Expression 34]

$$r^{(k)} = [r_0^{(k)}, r_1^{(k)}, \ldots, r_{N_D-1}^{(k)}]^T \quad (34)$$

[Expression 35]

"first symbol group" \hfill (35)

$$\hat{d}_j^{(k-1)} = \underset{\hat{d}_j^{(k-1)} \in D_j}{\operatorname{argmin}} |r_{Y+j}^{(k)} - \beta_j \hat{d}_j^{(k-1)}|^2 + |r_Y^{(k-1)} - \hat{d}_j^{(k-1)}|^2 \quad 0 \le j \le N_R - 1$$

"second symbol group"

$$\hat{d}_{N_D-j}^{(k-1)} = \underset{\hat{d}_{N_D-j}^{(k-1)} \in D_{N_D-j}}{\operatorname{argmin}} |(r)_{Y-j}^{(k)} - \beta_{-j}\hat{d}_{N_D-j}^{(k-1)}|^2 + |r_{N_D-1}^{(k-1)} - \hat{d}_{N_D-j}^{(k-1)}|^2 \quad 1 \le j \le N_L - 1$$

In the reception apparatus that receives the SC block signal transmitted from the transmission apparatus according to the sixth and seventh embodiments, the same demodulation method can also be used.

Ninth Embodiment

A transmission apparatus according to a ninth embodiment is described next. Configurations of the transmission apparatus according to the present embodiment are identical to those of the fifth embodiment. Parts different from those of the fifth embodiment are explained below.

In the fifth embodiment, the symbol of the previous block is used for a part of the symbols in the block. However, a symbol which is present in the same quadrant as the symbol of the previous block can be used for a part of the symbols in the block. For example, symbol setting as represented by the following expression (36) can be performed.

[Expression 36]

$d_{Y-j}^{(k)}$=same quadrant $(\beta_{-j} d_{N_D-j}^{(k-1)})$ j=1, . . . ,$N_L$ $d_Y^{(k)}$=same quadrant $(\beta_0 d_0^{(k-1)})$ $d_{Y+j}^{(k)}$=same quadrant $(\beta_j d_j^{(k-1)})$ j=1, . . . ,$N_R$ \hfill (36)

Figure 23:
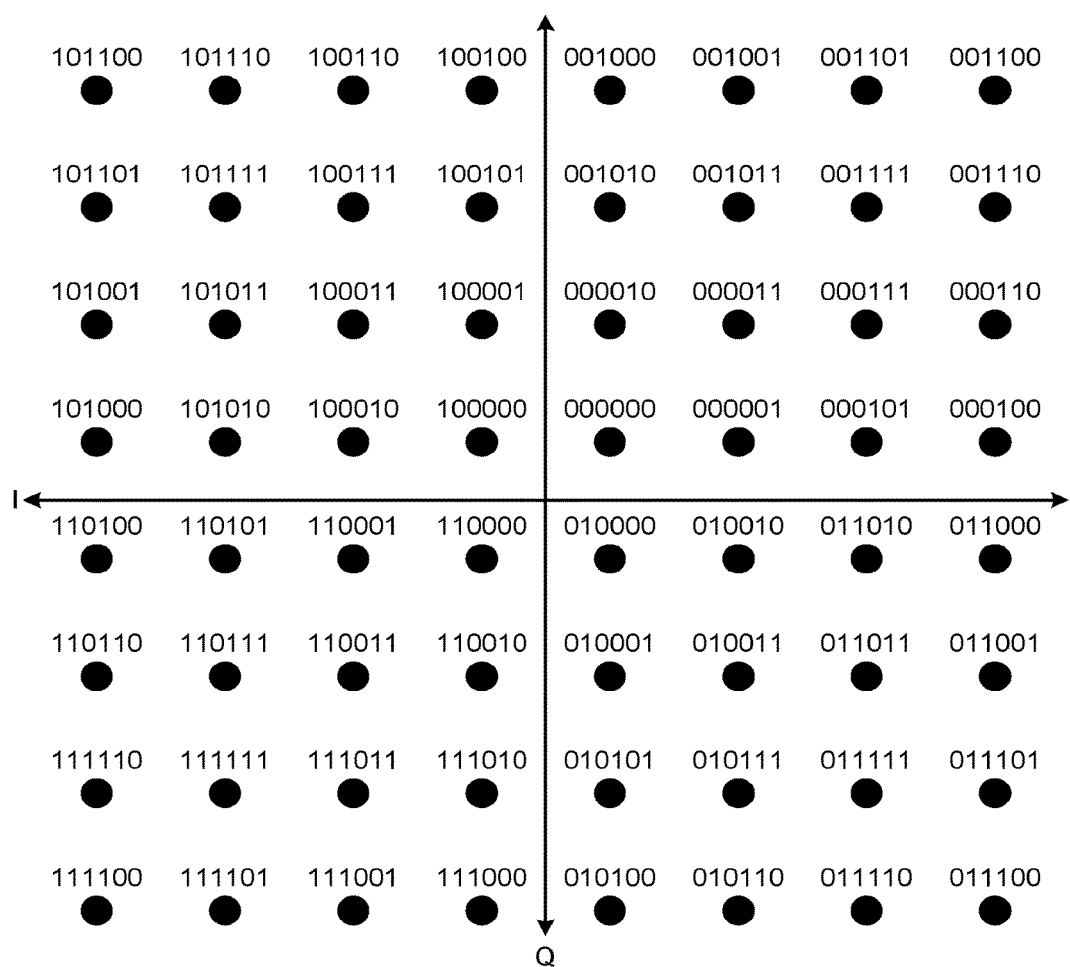
FIG. 23 is a diagram illustrating a 64QAM constellation.

In the above expression (36), the same quadrant (A) denotes the symbol in the same quadrant as a symbol A. A specific example of the present embodiment is described. FIG. 23 is a diagram illustrating a 64QAM constellation. FIG. 24 is a diagram illustrating an example of symbol arrangement when the 64QAM constellation is used, where $N_L$=1 and $N_R$=2 are set. To simplify the description, in FIG. 24, bits of the 64QAM symbols in FIG. 23 are used. As illustrated in FIG. 24, in the $(k+1)^{th}$ block, upper 2 bits of a symbol having a symbol number Y is "00", which are the same as upper 2 bits of a symbol having a symbol number 0 in the $k^{th}$ block. Similarly, in the $(k+1)^{th}$ block, upper 2 bits of a symbol having a symbol number (Y+1) is "10", which are the same as upper 2 bits of a symbol having a symbol number 1 in the $k^{th}$ block.

Because symbols are set as same-quadrant symbols by fixing the upper bits as in the specific example in FIG. 24, the transmittable number of bits increases when compared with the fifth embodiment. In the example in FIG. 24, 4×(1+2+1)=16 bits more can be transmitted in one block when compared with the case of not using the same-quadrant symbols but using the same symbols.

Tenth Embodiment

Figure 25:
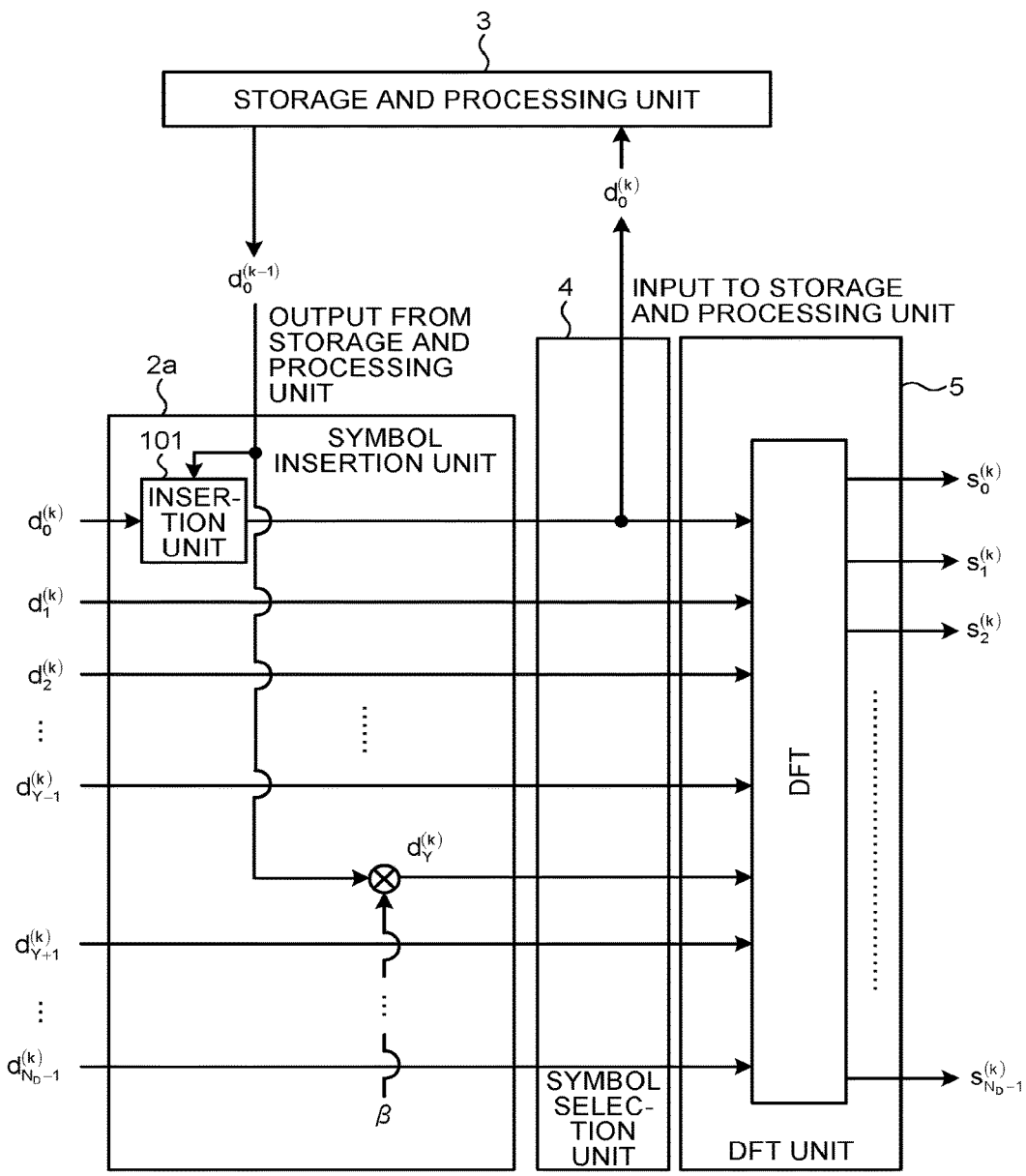
FIG. 25 is a diagram illustrating an example configuration of a transmission apparatus according to a tenth embodiment.

FIG. 25 is a diagram illustrating an example configuration by a transmission apparatus according to a tenth embodiment of the present invention. Configurations of the transmission apparatus according to the present embodiment are identical to those of the first embodiment except for substituting a symbol insertion unit 2a for the symbol insertion unit 2. The symbol insertion unit 2a includes an insertion unit 101. Parts different from those of the first embodiment are explained below.

Figure 26:
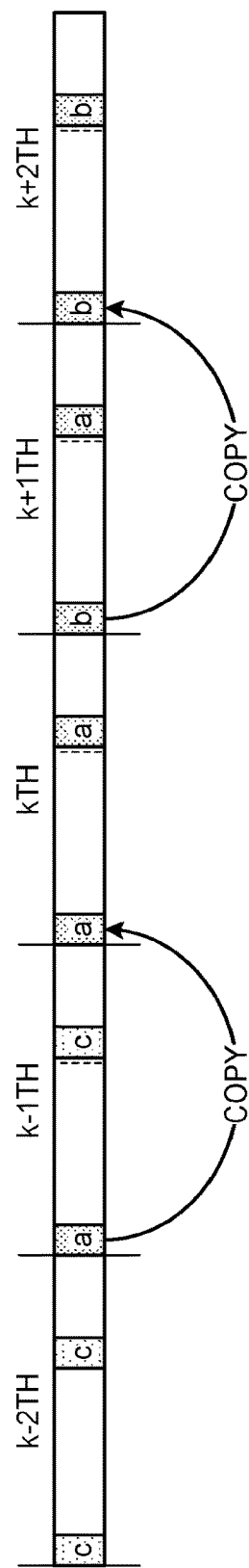
FIG. 26 is a diagram illustrating an example of continuously inserting a past symbol $d_0^{(k-1)}$ into the $0^{th}$ symbol in one block.
Figure 27:
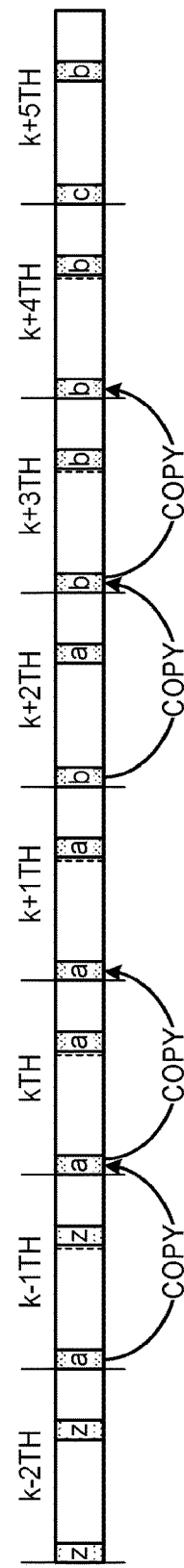
FIG. 27 is a diagram illustrating an example of continuously inserting the past symbol $d_0^{(k-1)}$ into the $0^{th}$ symbol in two blocks.

The insertion unit 101 has a function of inserting a past symbol $d_0^{(k-1)}$ into the $0^{th}$ symbol over several blocks. FIG. 26 is a diagram illustrating an example of inserting the past symbol $d_0^{(k-1)}$ into the $0^{th}$ symbol continuously in one block. FIG. 27 is a diagram illustrating an example of inserting the past symbol $d_0^{(k-1)}$ into the $0^{th}$ symbol continuously in two blocks.

Figure 28:
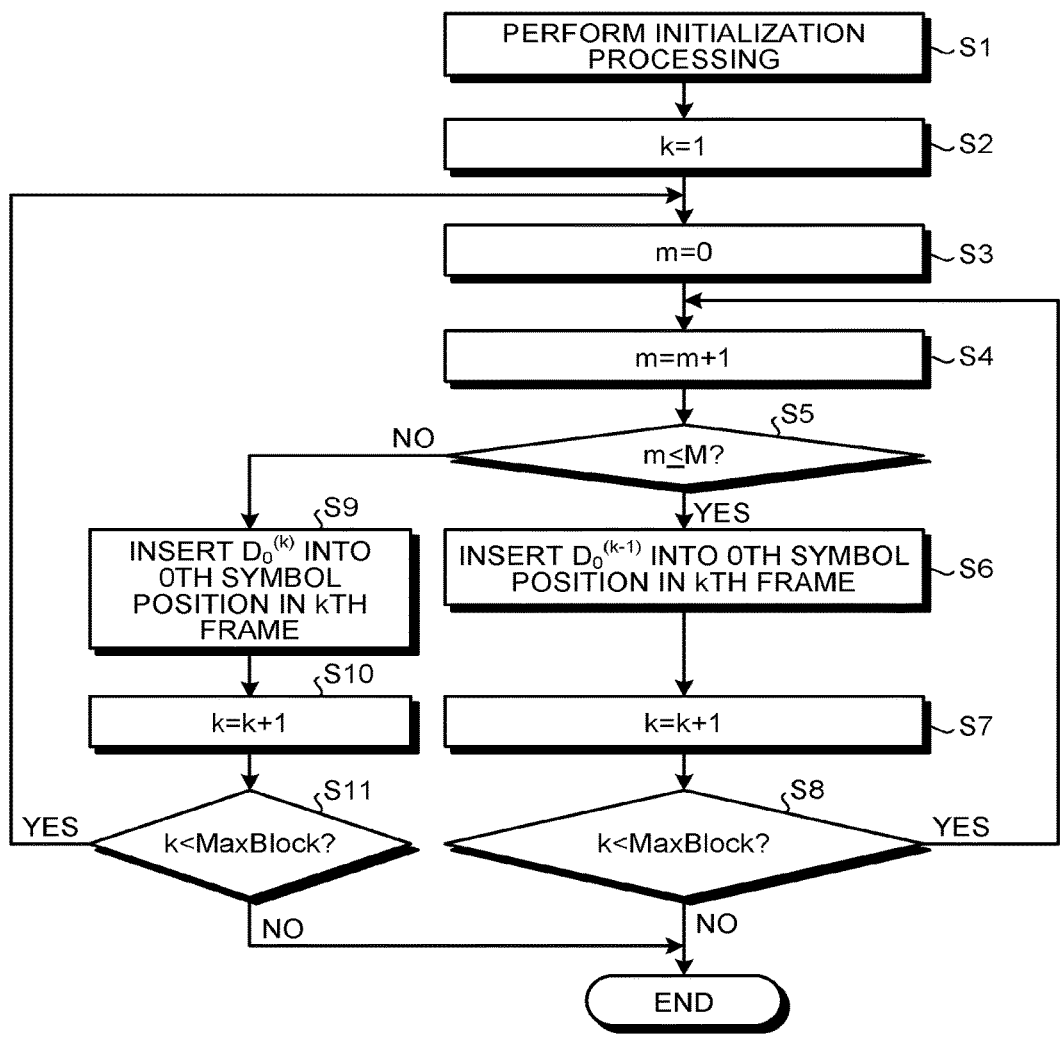
FIG. 28 is a flowchart illustrating an example of an operation performed by an insertion unit according to the tenth embodiment.

FIG. 28 is a flowchart illustrating an operation example of the insertion unit 101 according to the present embodiment. The insertion unit 101 first performs initialization processing (Step S1) and then sets k=1 (Step S2). It is assumed that a block of k=0 is created in the initialization processing. The insertion unit 101 sets m=0 (Step S3), and then sets m=m+1 (Step S4). Thereafter, the insertion unit 101 determines whether m is equal to or larger than M that is the number of blocks into which the past symbol is inserted continuously (Step S5). When m is equal to or smaller than M (YES at Step S5), the insertion unit 101 inserts $d_0^{(k-1)}$ into the $0^{th}$ symbol position in the $k^{th}$ frame (Step S6). The insertion unit 101 sets k=k+1 (Step S7), and determines whether k is smaller than the maximum number of blocks MaxBlock (Step S8). When k is not smaller than the MaxBlock (NO at Step S8), the insertion unit 101 finishes the processing.

At Step S8, when k is smaller than the maximum number of blocks MaxBlock (YES at Step S8), the process proceeds to Step S4. At Step S5, when m is larger than M (NO at Step S5), the insertion unit 101 inserts $d_0^{(k)}$ into the $0^{th}$ symbol position in the $k^{th}$ frame (Step S9), and the process proceeds to Step S3. When inserting the past symbol $d_0^{(k-1)}$ into the $0^{th}$ symbol, phase rotation may be applied to $d_0^{(k-1)}$. The insertion unit 101 sets k=k+1 (Step S10), and determines whether k is smaller than the maximum number of blocks MaxBlock (Step S11). When k is not smaller than the MaxBlock (NO at Step S11), the processing is finished.

Eleventh Embodiment

Figure 29:
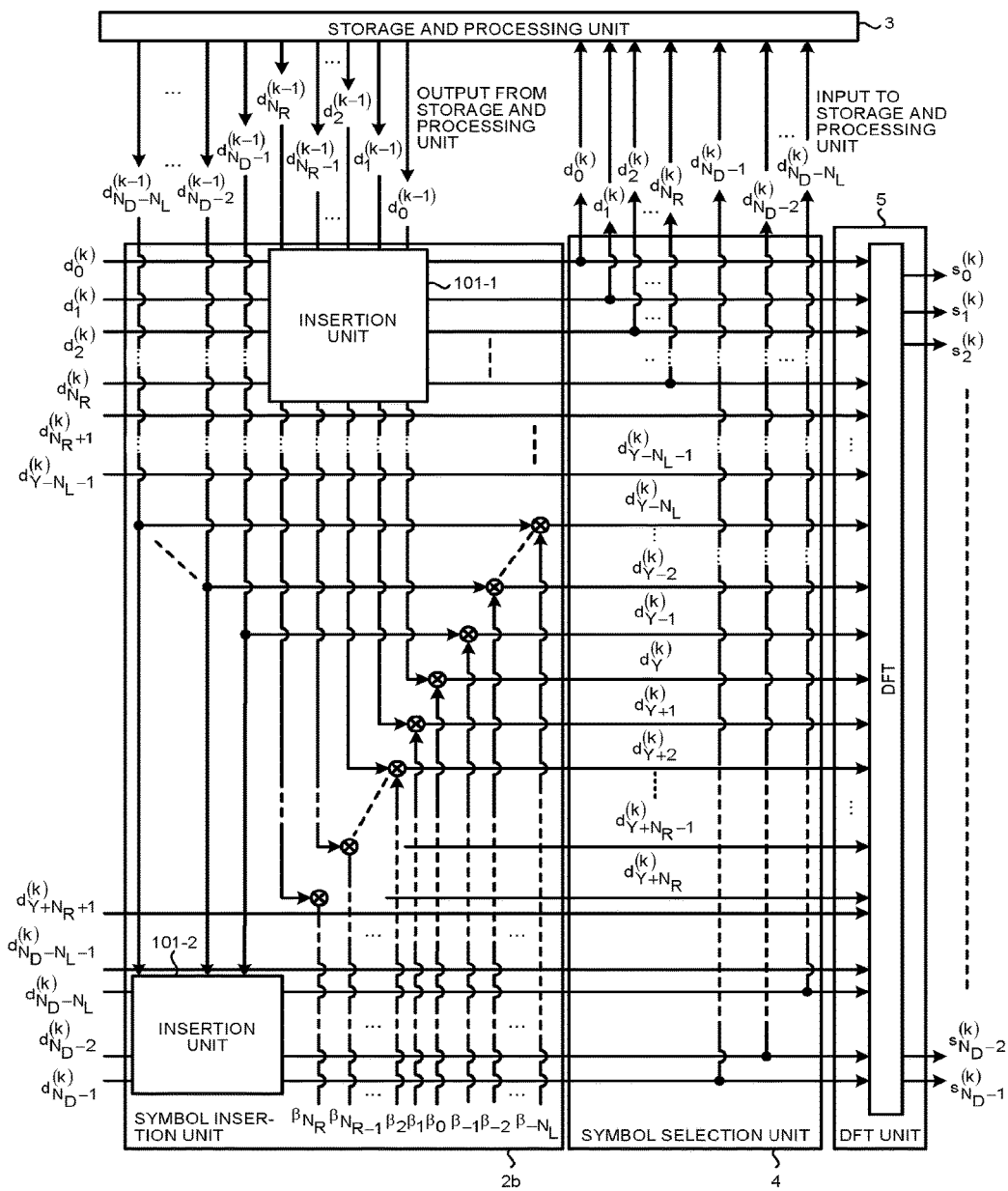
FIG. 29 is a diagram illustrating an example configuration of a transmission apparatus according to an eleventh embodiment.

FIG. 29 is a diagram illustrating an example configuration by a transmission apparatus according to an eleventh embodiment of the present invention. Configurations of the transmission apparatus according to the present embodiment are identical to those of the fifth embodiment except for substituting a symbol insertion unit 2b for the symbol insertion unit 2. A symbol insertion unit 2b includes insertion units 101-1 and 101-2. Parts different from those of the fifth embodiment are explained below.

The method of copying a symbol over a plurality of blocks described in the tenth embodiment can be used on the first and second symbol groups described in the fifth embodiment. The insertion unit 101-1 inserts the first symbol group over a plurality of blocks, and the insertion unit 101-2 inserts the second symbol group over a plurality of blocks.

Figure 30:
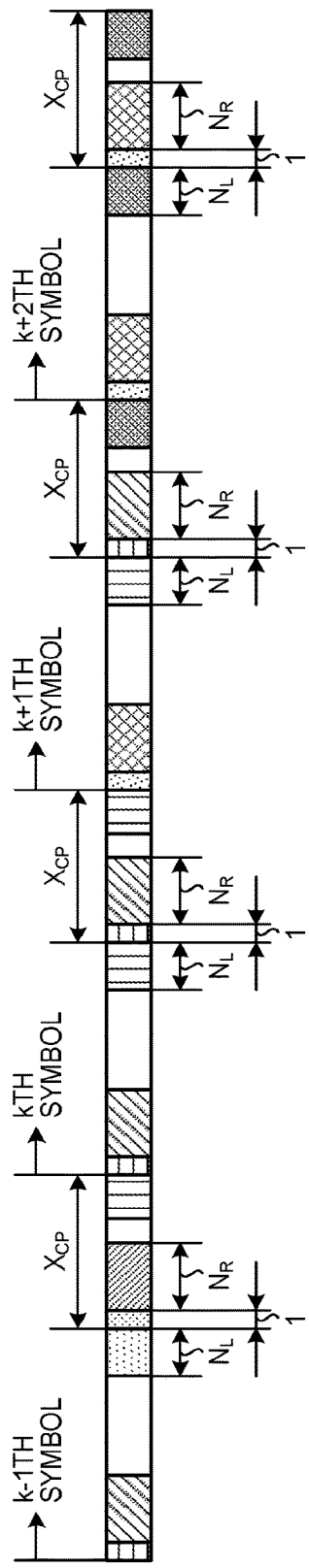
FIG. 30 is a diagram illustrating an example in which first and second groups are copied at an interval of one block.
Figure 31:
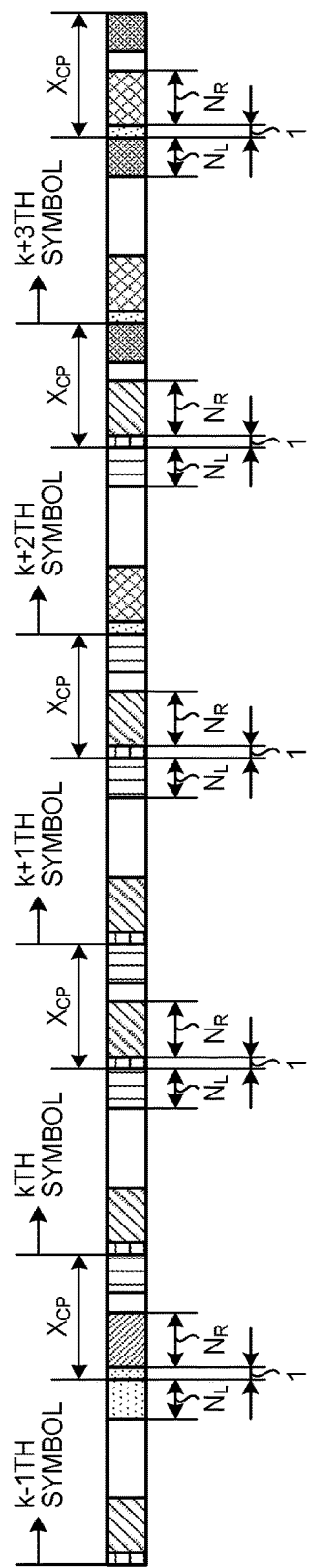
FIG. 31 is a diagram illustrating an example in which the first and second groups are copied continuously in two blocks.

FIG. 30 is a diagram illustrating an example in which first symbol group and second symbol group are copied at an interval of one block. FIG. 31 is a diagram illustrating an example in which first and second groups are copied continuously in two blocks.

Figure 32:
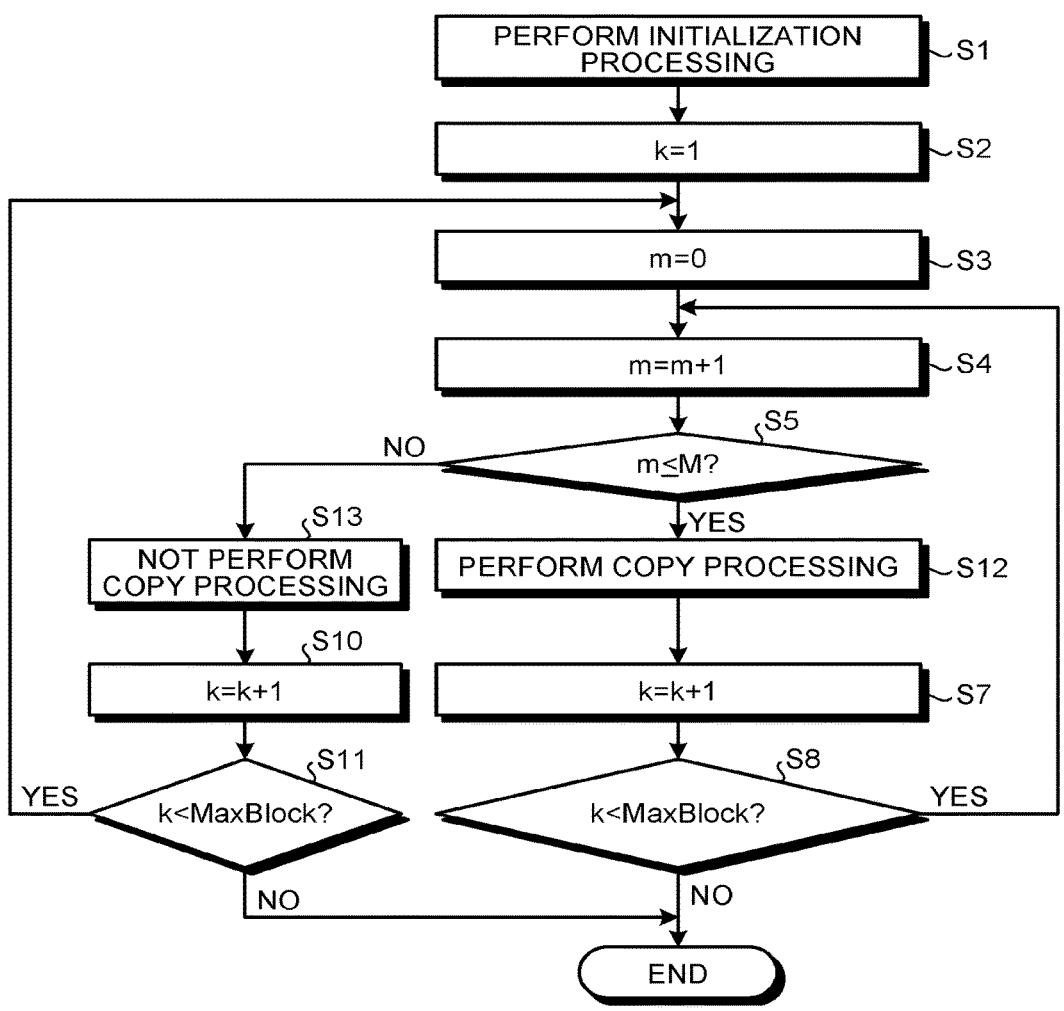
FIG. 32 is a flowchart illustrating an example of an operation performed by an insertion unit according to the eleventh embodiment.

FIG. 32 is a flowchart illustrating an operation example of the insertion units 101-1 and 101-2 according to the present embodiment. Steps S1 to S5 in FIG. 32 are the same as those of the tenth embodiment. At Step S5, when m is equal to or smaller than M (YES at Step S5), the insertion units 101-1 and 101-2 performs copy processing represented by the following expression (37) (Step S12), and proceed to Step S7. Steps S7, S8, S10, and S11 are the same as those of the tenth embodiment.

[Expression 37]

$$d_{N_D-j}^{(k)} = d_{N_D-j}^{(k-1)} \quad j = 1, \ldots, N_L$$
$$d_0^{(k)} = d_0^{(k-1)}$$
$$d_j^{(k)} = d_j^{(k-1)} \quad j = 1, \ldots, N_R \quad (37)$$

At Step S5, if m is larger than M (NO at Step S5), the insertion units 101-1 and 101-2 do not perform copy processing (Step S13), and proceed to Step S10. When copy processing is not performed, the insertion units 101-1 and 101-2 insert the symbol output from the data-symbol generation unit 1 into $d_1^{(k)}$ (i being from i=0 to i=$N_R$) and $d_{N_D-1}^{(k)}$ (i being from i=1 to i=$N_L$).

Twelfth Embodiment

Figure 33:
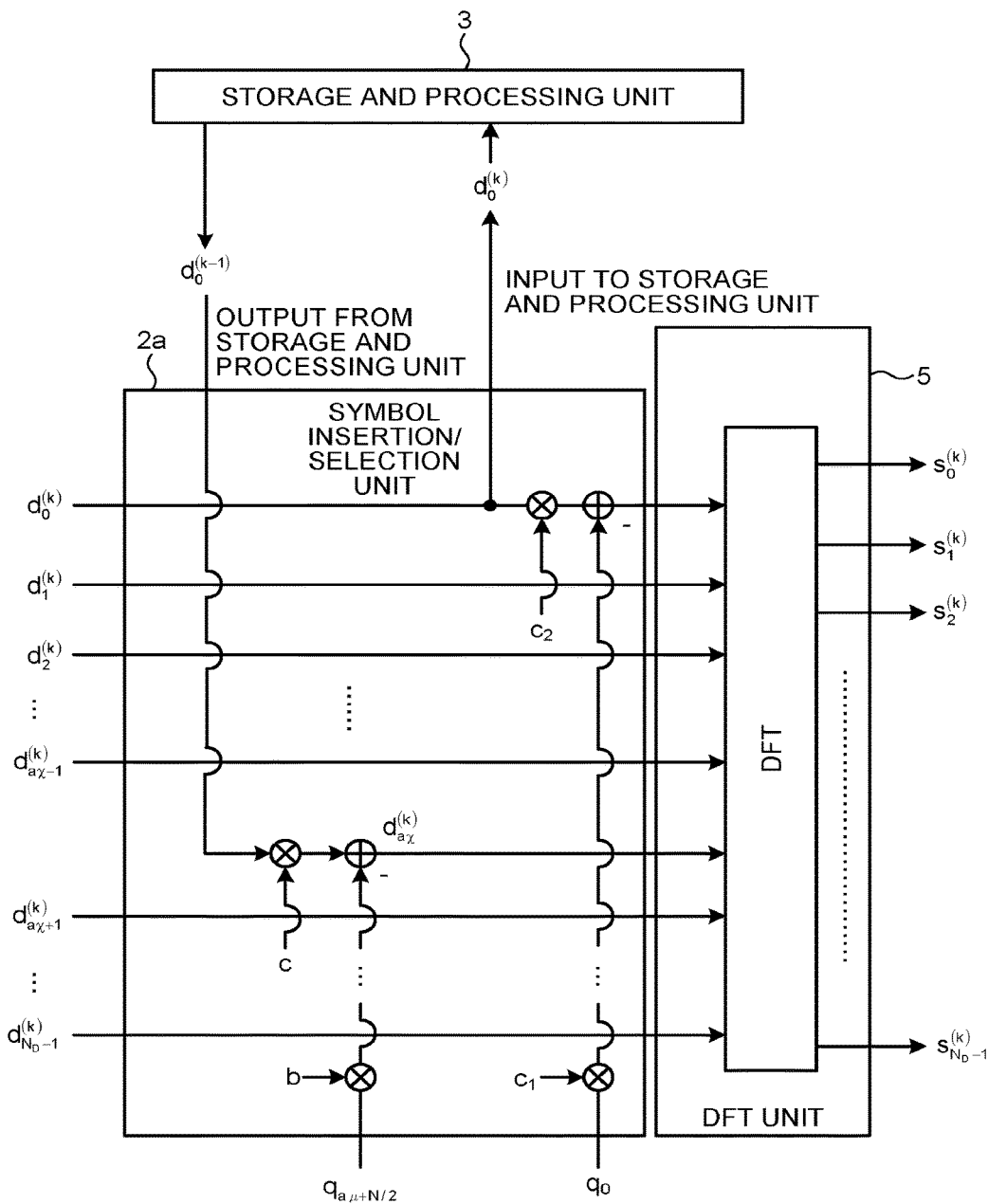
FIG. 33 is a diagram illustrating an example configuration of a transmission apparatus according to a twelfth embodiment and an example of processing performed by the transmission apparatus according.

FIG. 33 is a diagram illustrating an example configuration and a processing example by a transmission apparatus according to a twelfth embodiment of the present invention. In the transmission apparatus according to the present embodiment, the symbol insertion unit 2 and the symbol selection unit 4 according to the third embodiment are configured as one symbol insertion/selection unit 2a. In this manner, in the third embodiment, the symbol insertion unit 2 and the symbol selection unit 4 can be integrated. The processing taking into consideration the time domain signal of a pilot signal can be performed on data symbols at a position other than the position described in the third embodiment. The processing illustrated in FIG. 33 is a processing in which the processing of the symbol insertion unit 2 and the processing of the symbol selection unit 4 are integrated, in addition to the processing according to the third embodiment. In the present embodiment, for example, the processing represented by the following expression (38) may be added.

[Expression 38]

$$d_0^{(k)} = c_2 d_0^{(k)} - c_1 q_0 \quad (38)$$

In the above expression, $c_1$ and $c_2$ are complex numbers or real numbers like b and c in the expression (28) A predetermined selection position and a predetermined insertion position are decided such that the phase of the first sample of the block becomes continuous with the phase of the last sample of the previous block. Therefore, when the pilot signals are to be multiplexed, the out-of-band spectrum can be reduced as in the first embodiment.

Further, when the above processing is to be performed on the transmission apparatus side, the reception method in the reception apparatus described in the fourth embodiment becomes a method of performing the processing represented by the following expression (39).

[Expression 39]

$$\hat{d}_0^{(k-1)} = \underset{d_0^{(k-1)} \in D}{\mathrm{argmin}} \, | v_{\alpha_\chi}^{(k)} - c d_0^{(k-1)} + b q_{a\mu+N/2} |^2 + | v_0^{(k-1)} - c_2 d_0^{(k-1)} + c_1 q_0 |^2 \quad (39)$$

Thirteenth Embodiment

Figure 34:
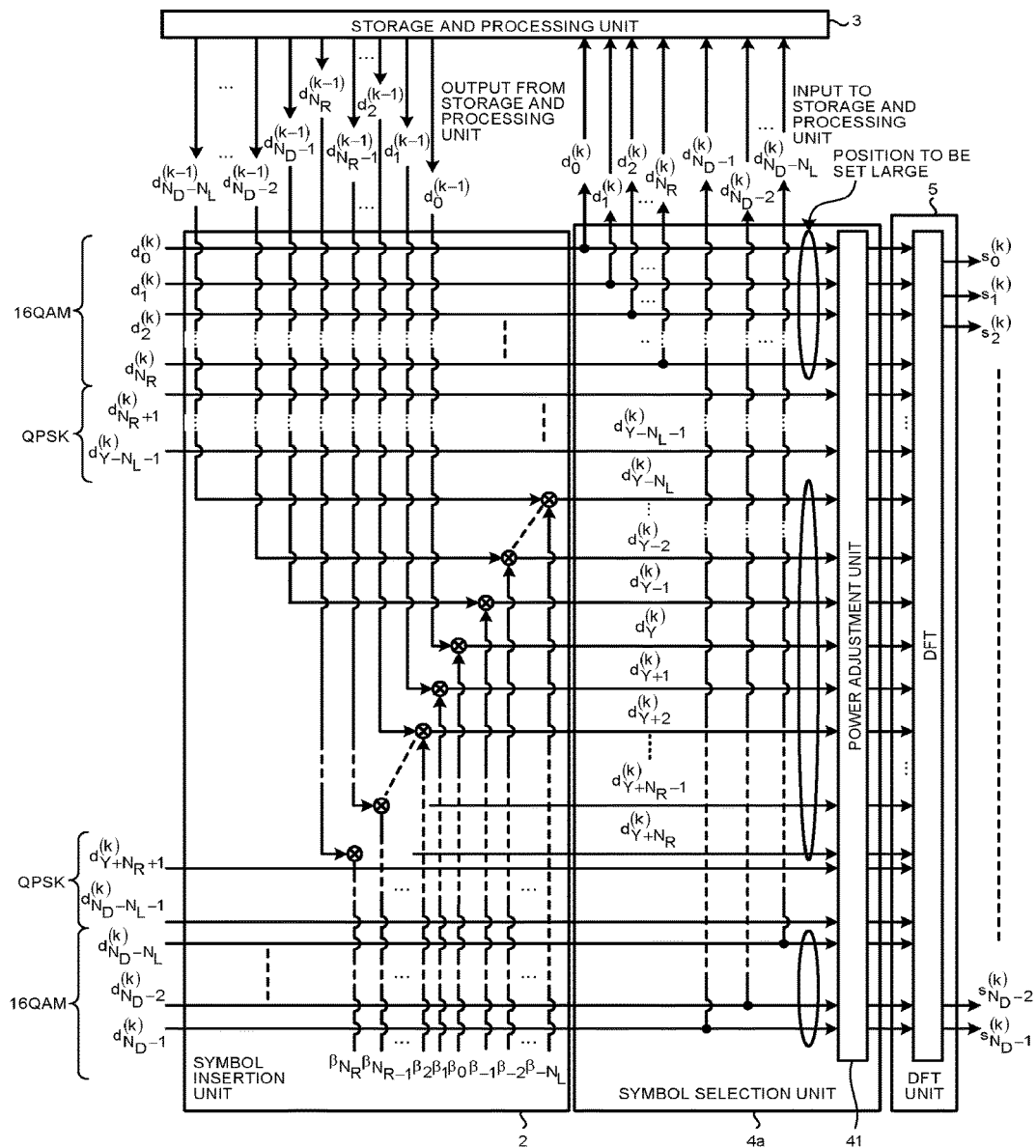
FIG. 34 is a diagram illustrating an example configuration of a symbol selection unit 4a according to the twelfth embodiment.

A transmission apparatus according to a thirteenth embodiment is described next. As in the seventh embodiment, when different multiplexed symbols are mixed, power adjustment may be performed in the symbol selection unit. FIG. 34 is a diagram illustrating an example configuration of the symbol selection unit 4a according to the present embodiment. As illustrated in FIG. 34, the symbol selection unit 4a includes a power adjustment unit 41 therein. In the power adjustment unit 41, power adjustment is performed on an input value. For example, given it is assumed that the number of inputs and the number of outputs of the power adjustment unit 41 are N, adjustment may be performed as represented by the following expression (40).

[Expression 40]

$$y_0 = g_0 d_0$$
$$\vdots$$
$$y_k = g_k d_k$$
$$\vdots$$
$$y_{N-1} = g_{N-1} d_{N-1} \quad (40)$$

In the above expression (40), $g_k$ is a power adjustment coefficient (0.5, 1.2, or the like). Given that power distribution is not to be changed, it may be set as $g_k=1$. $g_k$ is adjusted such that integrated input power and integrated output power become the same. As the setting method of $g_k$, any method can be used. In the case where the specific example is illustrated in FIG. 34, by using 16QAM, mean bit error characteristics deteriorate more than the case of using QPSK. Therefore, power larger than the symbols using the QPSK is set on the symbols using the 16QAM, that is, symbols from $d_0^{(k)}$ to $d_{NR}^{(k)}$, from $d_{ND-1}^{(k)}$ to $d_{ND-NL}^{(k)}$, and from $d_{Y-NL}^{(k)}$ to $d_{Y+ND}^{(k)}$ (portions circled in FIG. 34). Further, it may be set to decrease power of the symbol using the QPSK such that the integrated power becomes constant, and may be set a value that prevents deterioration of a symbol error rate, a bit error rate, or a block error rate, or a packet error rate. When $0 \le k \le N_D-1$ is established, $g_k$ can be calculated by using the values of $N_D$, $N_R$, and $N_L$. An example of the processing in the reception apparatus corresponding to the present embodiment is as represented by the following expression (41).

[Expression 41]

"first symbol group" (41)

$$\hat{d}_j^{(k-1)} = \underset{\hat{d}_j^{(k-1)} \in D_j}{\operatorname{argmin}} \ |r_{Y+j}^{(k)} - \beta_j g_j \hat{d}_j^{(k-1)}|^2 + |r_Y^{(k-1)} - g_j \hat{d}_j^{(k-1)}|^2 \quad 0 \le j \le N_R$$

"second symbol group"

$$\hat{d}_{N_D-j}^{(k-1)} = \underset{\hat{d}_{N_D-j}^{(k-1)} \in D_{N_D-j}}{\operatorname{argmin}} \ |(r)_{Y-j}^{(k)} - \beta_{-j} g_{N_D-j} \hat{d}_{N_D-j}^{(k-1)}|^2 + |r_{N_D-j}^{(k-1)} - g_{N_D-j} \hat{d}_{N_D-j}^{(k-1)}|^2 \quad 1 \le j \le N_L$$

Figure 35:
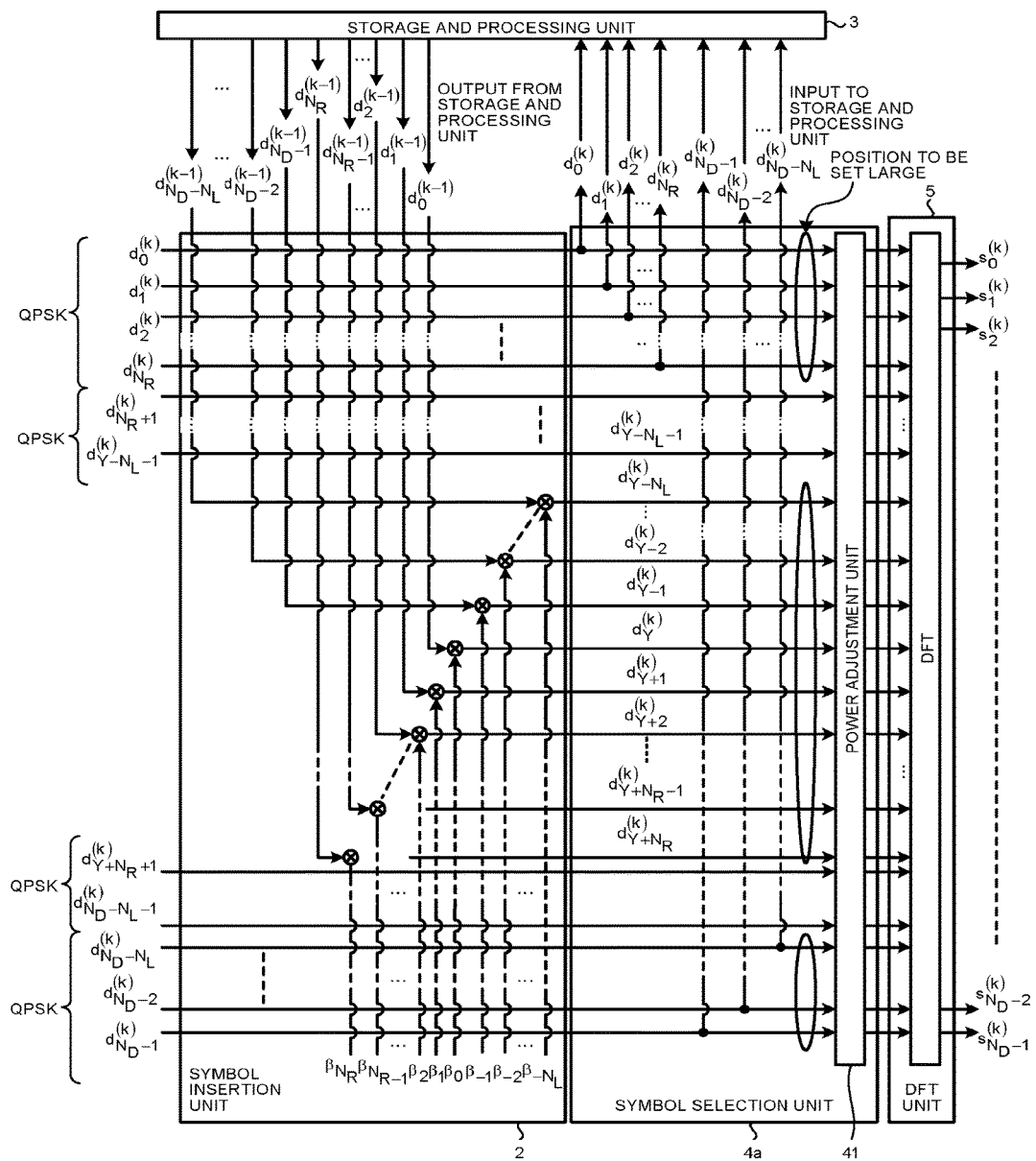
FIG. 35 is a diagram illustrating an example configuration of a power adjustment unit when QPSK is used for all the cases.

Even if the same modulation method is used for all the cases, characteristic deterioration can be prevented by performing power adjustment. Because the symbol at a predetermined position is repeated several times, power at a certain position can be increased and power at another position can be decreased. As a specific example, an example is illustrated in FIG. 35. FIG. 35 is a diagram illustrating an example configuration of the power adjustment unit 41 when the QPSK is used for all the cases. Because the symbols of the previous block are used for symbols $d_{Y-NL}^{(k)}$ to $d_{Y+ND}^{(k)}$ and if the previous block is to be demodulated, symbols that are set as $d_{Y-NL}^{(k)}$ to $d_{Y+ND}^{(k)}$ appear twice. Therefore, power of the symbols of from $d_{Y-NL}^{(k)}$ to $d_{Y+ND}^{(k)}$ and power of the symbols to be copied to symbols of from $d_{Y-NL}^{(k+1)}$ to $d_{Y+ND}^{(k+1)}$ (that is, the symbols of from $d_0^{(k)}$ to $d_{NR}^{(k)}$ and symbols of from $d_{ND-NL}^{(k)}$ to $d_{ND-1}^{(k)}$ can be set to be lower than the power of symbols other than the symbols of from $d_0^{(k)}$ to $d_{NR}^{(k)}$, from $d_{ND-NL}^{(k)}$ to $d_{ND-1}^{(k)}$, and from $d_{Y-NL}^{(k)}$ to $d_{Y+NR}^{(k)}$. The power of symbols other than symbols of from $d_0^{(k)}$ to $d_{NR}^{(k)}$, from $d_{ND-NL}^{(k)}$ to $d_{ND-1}^{(k)}$, and from $d_{Y-NL}^{(k)}$ to $d_{Y+NR}^{(k)}$ can be set large by the amount of setting the power of symbols of from $d_0^{(k)}$ to $d_{NR}^{(k)}$, from $d_{ND-NL}^{(k)}$ to $d_{ND-1}^{(k)}$, and from $d_{Y-NL}^{(k)}$ to $d_{Y+NR}^{(k)}$ to be low. At this time, power setting needs to be performed such that the integrated output power in one block ($N_D$ symbols) becomes the same. It may be set to be a value that prevents deterioration of the symbol error rate, the bit error rate, or the block error rate, or the packet error rate. Further, given that $0 \le k \le N_D-1$ is established, $g_k$ can be calculated by using the values of $N_D$, $N_R$, and $N_L$.

INDUSTRIAL APPLICABILITY

As described above, the transmission apparatus, the reception apparatus, and the communication system according to the present invention are useful for a communication system that performs SC block transmission, and are particularly suitable for a system that performs CP insertion.

REFERENCE SIGNS LIST 1 symbol generation unit, 2 symbol insertion unit, 2a symbol insertion/selection unit, 3 storage and processing unit, 4, 4a symbol selection unit, 5 time/frequency conversion unit, DFT unit, 6, 11 waveform shaping filter unit, 7 guard-band insertion unit, 8 interpolation unit, 9 CP insertion unit, 10 pilot-signal generation unit, 12 frequency-domain arrangement unit, 13 CP removal unit, 14 DFT unit, 15 channel estimation unit, 16 frequency-domain equalization unit, 17 undersampling unit, 18, 82, 181 IDFT unit, 19, 191 symbol selection unit, 20, 201 storage and processing unit, 21, 211 demodulation unit, 22, 221 decoding unit, 23 pilot-signal removal unit, 41 power adjustment unit, 81 oversampling unit, 101, 101-1, 101-2 insertion unit.

The invention claimed is:

1. A method for a transmission apparatus that transmits a block signal including a plurality of data symbols, the method comprising:
generating, in each block, data symbols for one block;
storing, in a storage, a data symbol at a first position, among the data symbols for one generated block, as a copied symbol;
generating a block symbol with an arrangement of the data symbol and the copied symbol such that the copied symbol in a previous block, stored in the storage, is inserted at a second position of the data symbols for one generated block to maintain a continuity of phase between the previous block and the one generated block;
converting the block symbol into a frequency domain signal;
performing interpolation processing on the frequency domain symbol; and
inserting a Cyclic Prefix (CP) into a signal on which the interpolation processing has been performed to generate the block signal.

2. The method according to claim 1, further comprising:
performing oversampling to increase the number of data points on the frequency domain signal, and
performing an inverse Fourier transform on the frequency domain signal on which the oversampling has been performed.

3. A method for a reception apparatus that receives a signal transmitted according to the method of claim 2, as a received signal, the method comprising:
removing a Cyclic Prefix from the received signal;
generating a frequency domain signal by performing Discrete Fourier Transform (DFT) processing on the received signal from which the Cyclic Prefix has been removed;
performing estimation of a channel based on the frequency domain signal;
performing equalization processing based on the frequency domain signal and an estimation result of the channel;

performing undersampling processing on a signal on which the equalization processing has been performed;
performing Inverse Discrete Fourier Transform (IDFT) processing on a signal on which the undersampling processing has been removed;
selecting a data symbol at a first position from a signal on which the IDFT processing has been performed;
storing, in a storage, a selected symbol selected in the selecting step;
demodulating a data symbol other than a data symbol at a second position from the signal on which the IDFT processing has been performed; and
demodulating the data symbol at the second position by using the data symbol at the second position and the selected symbol stored in the storage.

4. The method according to claim 1, wherein
the first position is designated as a head position of the data symbols for one block,
the second position is designated as a head position of the data symbols to be copied as a Cyclic Prefix, and
the interpolation processing is performed such that an interpolated point that has interpolated a last symbol of the block symbol and a head symbol of the block symbol, into which the CP has been inserted, is added behind the last symbol.

5. The method according to claim 1, further comprising:
performing waveform shaping processing on the frequency domain signal; and
performing guard-band insertion processing on the frequency domain signal on which the waveform shaping processing has been performed,
wherein the interpolation processing is performed on the frequency domain signal on which the guard-band insertion processing has been performed.

6. The method according to claim 1, wherein at least one of a phase rotation and amplitude adjustment is applied to the copied symbol.

7. The method according to claim 1, wherein a modulation method of the data symbol at the first position is set to be different from a modulation method that is applied to one or more of the data symbols which are other than the data symbol at the first position.

8. The method according to claim 1, wherein
the first position is designated as a head position of the data symbols for one block,
the second position is designated as a head position of the data symbol that is to be copied as a Cyclic Prefix,
the storage stores therein
a first symbol group, which is a first number of symbols at a head of the data symbols, and
a second symbol group, which is a second number of symbols at a last symbol of the data symbols, as the copied symbol, and
the method further comprises:
generating a first same-quadrant symbol group configured with same-quadrant symbols that are in a same quadrant as respective symbols that constitute the first symbol group in a block one before, stored in the storage,
putting the first same-quadrant symbol group such that a head of the first same-quadrant symbols is at the second position,
generating a second same-quadrant symbol group configured with same-quadrant symbols that are in a same quadrant as respective symbols that constitute the second symbol group in a block one before, stored in the storage, and
putting the second same-quadrant symbol group such that a last symbol of the second same-quadrant symbol group is a symbol one before the second position.

9. The method according to claim 8, wherein
the first symbol group of a block one before, stored in the storage, is used as the first same-quadrant symbol group, and
the second symbol group of a block one before, stored in the storage, is used as the second same-quadrant symbol group.

10. The method according to claim 8, further comprising:
generating a first same-quadrant symbol group by applying phase rotation to the first same-quadrant symbol group in a block one before, stored in the storage; and
generating a second same-quadrant symbol group by applying phase rotation to the second same-quadrant symbol group in a block one before, stored in the storage.

11. The method according to claim 8, wherein a modulation method of at least one symbol of symbols that constitute the first same-quadrant symbol group and the second same-quadrant symbol group is set to be different from a modulation method of other symbols that constitute the first same-quadrant symbol group and the second same-quadrant symbol group.

12. The method according to claim 1, further comprising putting the copied symbol in a specified number of continuous blocks.

13. A communication system comprising:
a transmission apparatus that transmits a block signal including a plurality of data symbols and including circuitry configured to execute instruction to perform a method comprising:
generating, in each block, data symbols for one block,
storing, in a storage, a data symbol at a first position, among the data symbols for one generated block, as a copied symbol,
generating a block symbol with an arrangement of the data symbol and the copied symbol such that the copied symbol in a previous block, stored in the storage, is inserted at a second position of the data symbols for one generated block to maintain a continuity of phase between the previous block and the one generated block,
converting the block symbol into a frequency domain signal,
performing interpolation processing on the frequency domain symbol,
inserting a Cyclic Prefix (CP) into a signal on which the interpolation processing has been performed to generate the block signal,
performing oversampling to increase the number of data points on the frequency domain signal, and
performing an inverse Fourier transform on the frequency domain signal on which the oversampling has been performed; and
a reception apparatus that receives a signal transmitted from the transmission apparatus and that includes circuitry to execute instructions to perform a method comprising:
removing a Cyclic Prefix from the received signal,
generating a frequency domain signal by performing Discrete Fourier Transform (DFT) processing on the received signal from which the Cyclic Prefix has been removed, performing estimation of a channel based on the frequency domain signal, performing equalization processing based on the frequency domain signal and an estimation result of the channel, performing undersampling processing on a signal on which the equalization processing has been performed, performing Inverse Discrete Fourier Transform (IDFT) processing on a signal on which the undersampling processing has been removed, selecting a data symbol at a first position from a signal on which the IDFT processing has been performed, storing, in a storage, a selected symbol selected in the selecting step, demodulating a data symbol other than a data symbol at a second position from the signal on which the IDFT processing has been performed, and demodulating the data symbol at the second position by using the data symbol at the second position and the selected symbol stored in the storage.

* * * * *